United States Patent
Okutsu

(10) Patent No.: US 8,161,208 B2
(45) Date of Patent: Apr. 17, 2012

(54) PROCESSING APPARATUS, METHOD OF PROCESSING PRIORITY RESERVATION THEREFOR, AND STORAGE MEDIUM FOR STORING PROGRAM

(75) Inventor: Toshihisa Okutsu, Kawasaki (JP)

(73) Assignee: Canon Kabushiki Kaisha (JP)

( * ) Notice: Subject to any disclaimer, the term of this patent is extended or adjusted under 35 U.S.C. 154(b) by 700 days.

(21) Appl. No.: 11/860,877

(22) Filed: Sep. 25, 2007

(65) Prior Publication Data

US 2008/0077717 A1    Mar. 27, 2008

(30) Foreign Application Priority Data

Sep. 26, 2006  (JP) ................. 2006-260833

(51) Int. Cl.
*G06F 3/00* (2006.01)
*G06F 9/26* (2006.01)
(52) U.S. Cl. ........................ 710/36; 711/200
(58) Field of Classification Search ............. 710/36
See application file for complete search history.

(56) References Cited

U.S. PATENT DOCUMENTS 6,041,354 A * 3/2000 Biliris et al. ................ 709/226
2001/0015817 A1 * 8/2001 Adachi ..................... 358/1.13
2001/0016824 A1 * 8/2001 Matsushima ................. 705/5
2004/0263870 A1 * 12/2004 Itoh et al. .................. 358/1.1
2005/0243365 A1 * 11/2005 Noda ....................... 358/1.15

FOREIGN PATENT DOCUMENTS

JP    2000-242460 A    9/2000

* cited by examiner

*Primary Examiner* — Henry Tsai
*Assistant Examiner* — Juanito Borromeo
(74) *Attorney, Agent, or Firm* — Rossi, Kimms & McDowell LLP

(57) ABSTRACT

A processing apparatus which is capable of preventing an priority reservation for a particular period from being set for all of a plurality of apparatuses and improving convenience for a general user who does not use an priority reservation service, in a system for which the priority reservation is available. Reservation information about a reservation for priority use of peripherals (MFP-A, B, and C) is stored. The number of peripherals that are not reserved for priority use during a particular period in the peripherals with reference to the reservation information is detected. When the number of peripherals is one, an instruction not to accept a reservation for priority use during the particular period to the single peripheral that are not reserved for priority use during the particular period in the peripheral is issued.

9 Claims, 26 Drawing Sheets

FIG.3

| RESERVATION MANAGEMENT TABLE | | | | | |
|---|---|---|---|---|---|
| RESERVATION DATE | RESERVATION STARTING TIME | RESERVATION TERMINATION TIME | STATUS | PERIPHERAL NAME | USER NAME |
| 2006/6/6 | 9:00 | 10:00 | RESERVED | MFP-A | yamada |
| 2006/6/6 | 9:00 | 10:00 | RESERVED | MFP-B | tanaka |
| 2006/6/6 | 9:00 | 10:00 | FORBIDDEN | MFP-C | |
| 2006/6/6 | 10:00 | 11:00 | RESERVED | MFP-A | yamada |
| 2006/6/6 | 10:00 | 11:00 | RESERVED | MFP-B | tanaka |
| 2006/6/6 | 10:00 | 11:00 | FORBIDDEN | MFP-C | |
| 2006/6/6 | 11:00 | 12:00 | RESERVED | MFP-A | yamada |
| 2006/6/6 | 11:00 | 12:00 | FORBIDDEN | MFP-B | |
| 2006/6/6 | 11:00 | 12:00 | RESERVED | MFP-C | abe |

FIG.13A

| RESERVATION REQUEST COMMAND ||
|---|---|
| USER NAME | tanaka |
| RESERVATION DATE | 2006/06/06 |
| STARTING TIME | 9:00 |
| TERMINATION TIME | 10:00 |

FIG.13B

| RESERVATION RESPONSE COMMAND ||
|---|---|
| USER NAME | tanaka |
| RESERVATION DATE | 2006/06/06 |
| STARTING TIME | 9:00 |
| TERMINATION TIME | 10:00 |
| STATUS | OK |

⇔

| RESERVATION RESPONSE COMMAND ||
|---|---|
| USER NAME | tanaka |
| RESERVATION DATE | 2006/06/06 |
| STARTING TIME | 9:00 |
| TERMINATION TIME | 10:00 |
| STATUS | NG |

FIG.13C

| RESERVATION FORBID COMMAND ||
|---|---|
| FORBIDDEN DATE | 2006/06/06 |
| STARTING TIME | 9:00 |
| TERMINATION TIME | 10:00 |

FIG.14A

| RESERVATION MANAGEMENT TABLE | MFP-A (MASTER) | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-A | yamada |
| 2006/6/6 | 10:00 | 11:00 | RESERVED | MFP-B | abe |

| RESERVATION MANAGEMENT TABLE | MFP-B (SLAVE) | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 10:00 | 11:00 | RESERVED | MFP-B | abe |

| RESERVATION MANAGEMENT TABLE | MFP-C (SLAVE) | | | | |
|---|---|---|---|---|---|
| RESERVATION DATE | RESERVATION STARTING TIME | ESERVATION TERMINATION TIME | STATUS | PERIPHERAL NAME | USER NAME |

FIG.14B

| RESERVATION MANAGEMENT TABLE | MFP-A (MASTER) | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-A | yamada |
| 2006/6/6 | 9:00 | 10:00 | RESERVED | MFP-B | tanaka ← |
| 2006/6/6 | 10:00 | 11:00 | RESERVED | MFP-B | abe |

| RESERVATION MANAGEMENT TABLE | MFP-B (SLAVE) | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-B | tanaka ← |
| 2006/6/6 | 10:00 | 11:00 | RESERVED | MFP-B | abe |

| RESERVATION MANAGEMENT TABLE | MFP-C (SLAVE) | | | | |
|---|---|---|---|---|---|
| RESERVATION DATE | RESERVATION STARTING TIME | ESERVATION TERMINATION TIME | STATUS | PERIPHERAL NAME | USER NAME |

*FIG.15*

| RESERVATION MANAGEMENT TABLE | MFP-A (MASTER) | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-A | yamada |
| 2006/6/6 | 9:00 | 10:00 | RESERVED | MFP-B | tanaka |
| 2006/6/6 | 9:00 | 10:00 | FORBIDDEN | MFP-C | |
| 2006/6/6 | 10:00 | 11:00 | RESERVED | MFP-B | abe |

| RESERVATION MANAGEMENT TABLE | MFP-B (SLAVE) | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-B | tanaka |
| 2006/6/6 | 10:00 | 11:00 | RESERVED | MFP-B | abe |

| RESERVATION MANAGEMENT TABLE | MFP-C (SLAVE) | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | FORBIDDEN | MFP-C | |

FIG.24

| RESERVATION STATE TEMPORARY STORAGE TABLE | | | | |
|---|---|---|---|---|
| RESERVATION DATE | RESERVATION STARTING TIME | RESERVATION TERMINATION TIME | STATUS | PERIPHERAL NAME |
| 2006/6/6 | 9:00 | 10:00 | RESERVED | MFP-A |
| 2006/6/6 | 9:00 | 10:00 | AVAILABLE | MFP-C |

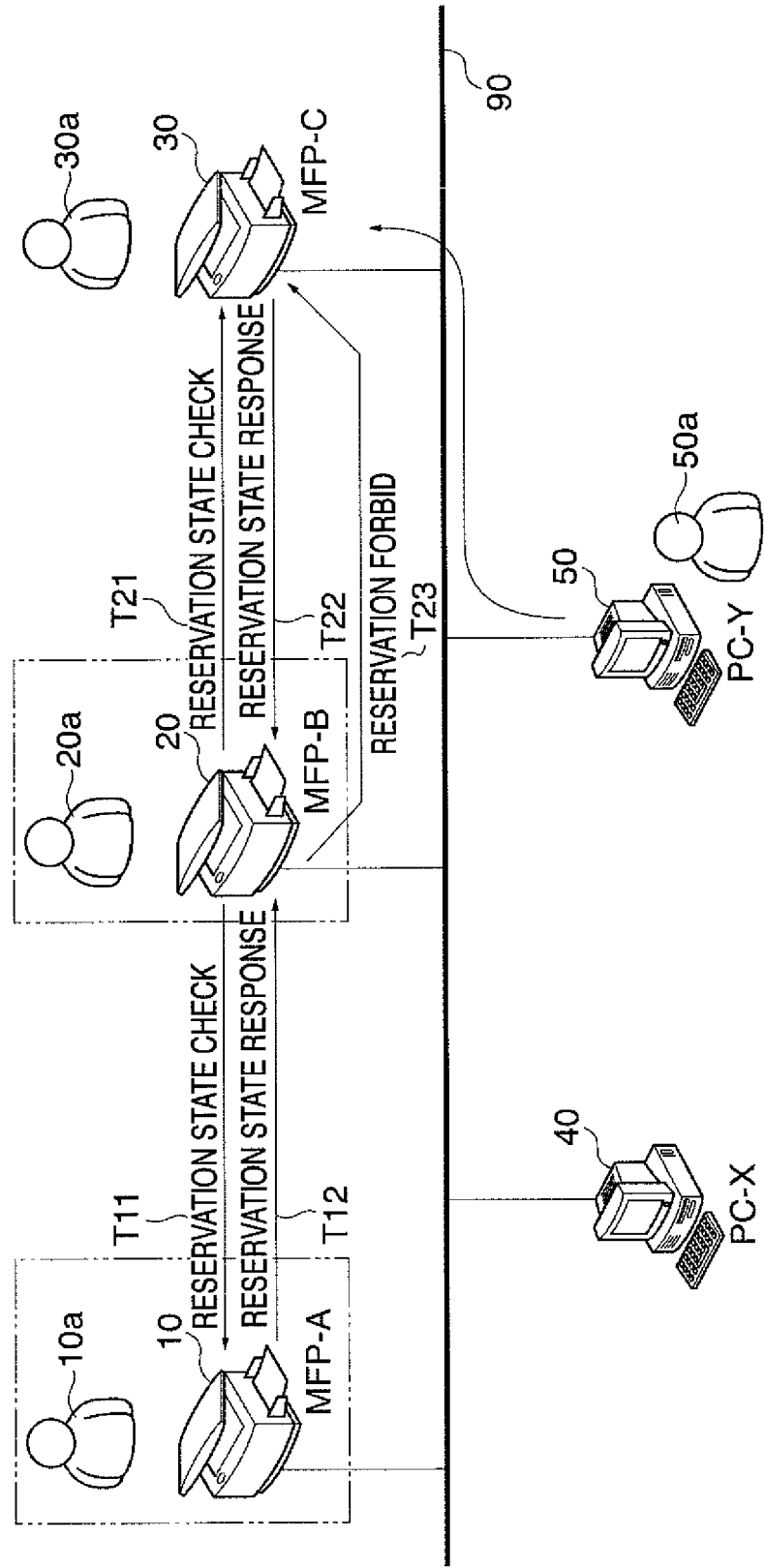

FIG.27A

| RESERVATION STATE CONFIRMATION COMMAND | |
|---|---|
| RESERVATION DATE | 2006/06/06 |
| STARTING TIME | 9:00 |
| TERMINATION TIME | 10:00 |

FIG.27B

| RESERVATION STATE RESPONSE COMMAND | |
|---|---|
| RESERVATION DATE | 2006/06/06 |
| STARTING TIME | 9:00 |
| TERMINATION TIME | 10:00 |
| STATUS | RESERVED |

| RESERVATION STATE RESPONSE COMMAND | |
|---|---|
| RESERVATION DATE | 2006/06/06 |
| STARTING TIME | 9:00 |
| TERMINATION TIME | 10:00 |
| STATUS | AVAILABLE |

FIG.27C

| RESERVATION FORBID COMMAND | |
|---|---|
| FORBIDDEN DATE | 2006/06/06 |
| STARTING TIME | 9:00 |
| TERMINATION TIME | 10:00 |

FIG.28A

| RESERVATION MANAGEMENT TABLE | MFP-A | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-A | yamada |

| RESERVATION MANAGEMENT TABLE | MFP-B | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 10:00 | 11:00 | RESERVED | MFP-B | abe |

| RESERVATION MANAGEMENT TABLE | MFP-C | | | | |
|---|---|---|---|---|---|
| RESERVATION DATE | RESERVATION STARTING TIME | ESERVATION TERMINATION TIME | STATUS | PERIPHERAL NAME | USER NAME |

FIG.28B

| RESERVATION MANAGEMENT TABLE | MFP-A | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-A | yamada |

| RESERVATION MANAGEMENT TABLE | MFP-B | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-B | tanaka ← |
| 2006/6/6 | 10:00 | 11:00 | RESERVED | MFP-B | abe |

| RESERVATION MANAGEMENT TABLE | MFP-C | | | | |
|---|---|---|---|---|---|
| RESERVATION DATE | RESERVATION STARTING TIME | ESERVATION TERMINATION TIME | STATUS | PERIPHERAL NAME | USER NAME |

FIG.29

| RESERVATION MANAGEMENT TABLE | MFP-A | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-A | yamada |

| RESERVATION MANAGEMENT TABLE | MFP-B | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | RESERVED | MFP-B | tanaka |
| 2006/6/6 | 10:00 | 11:00 | RESERVED | MFP-B | abe |

| RESERVATION MANAGEMENT TABLE | MFP-C | | | | |
|---|---|---|---|---|---|
| RESERVATION DATE | RESERVATION STARTING TIME | ESERVATION TERMINATION TIME | STATUS | PERIPHERAL NAME | USER NAME |
| 2006/6/6 | 9:00 | 10:00 | FORBIDDEN | MFP-C | |

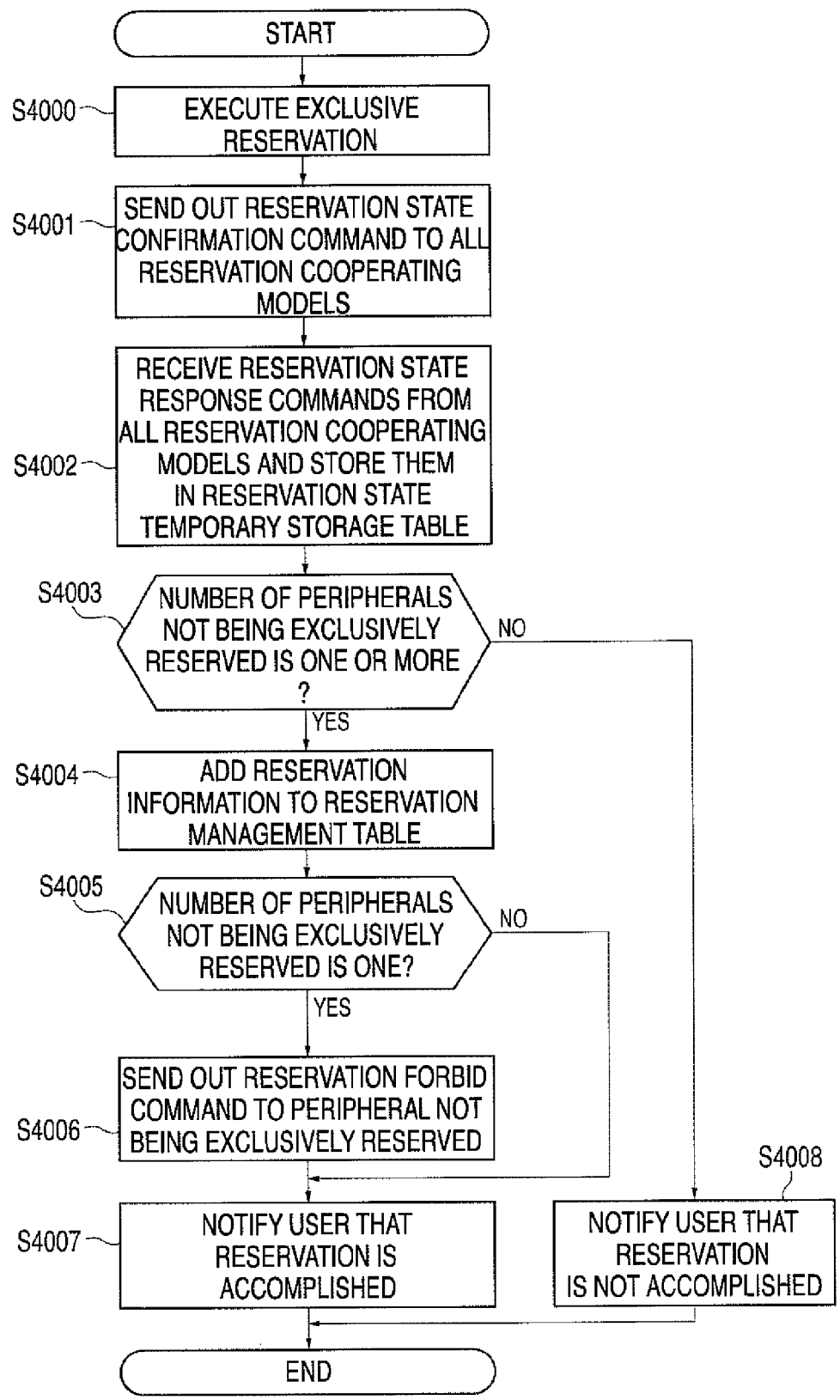

PROCESSING APPARATUS, METHOD OF PROCESSING PRIORITY RESERVATION THEREFOR, AND STORAGE MEDIUM FOR STORING PROGRAM

BACKGROUND OF THE INVENTION

1. Field of the Invention

The present invention relates to a processing apparatus such as a digital multifunction peripheral, a method of processing priority reservation therefor, and a storage medium for storing a program.

2. Description of the Related Art

Conventionally, an priority reservation service has been known as a technique for a user to use a digital multifunction peripheral by priority during a particular time period (hereinafter, such use is just referred to as "exclusive use"). In the exclusive reservation service, a user reserves a print job for a digital multifunction peripheral, so that the user can exclusively use the digital multifunction peripheral for the reserved job by priority during a particular time period (see Japanese Laid-Open Patent Publication (Kokai) No. 2000-242460, for example).

In the above exclusive reservation service, a single digital multifunction peripheral performs priority operation of job processing or refusal of job processing by other users. In a printing system comprising a plurality of conventional digital multifunction peripherals that provide such exclusive reservation services, the respective digital multifunction peripherals accept exclusive reservation services independently.

The exclusive reservation service by the above conventional digital multifunction peripheral can improve convenience for a user who performs a large amount of jobs for printing. However, it has a problem in that it does not satisfy convenience for a user who irregularly prints a small amount of jobs for a few pages.

In other words, in the above conventional printing system, peripherals do not cooperate in an exclusive reservation of a digital multifunction peripheral. Because of this, a user who performs a large amount of jobs for printing may set an exclusive reservation for all digital multifunction peripherals during a particular time period to secure a time frame for his/her exclusive use. On the other hand, a general user who irregularly performs printing of a small amount of jobs does not use an exclusive reservation service at all, therefore the user would use a digital multifunction peripheral for which an exclusive reservation is not set. However, if an exclusive reservation is set for all digital multifunction peripherals, such a general user can use no digital multifunction peripheral during that time period.

SUMMARY OF THE INVENTION

The present invention provides a processing apparatus, in a system for which an priority reservation is available, which is capable of preventing an priority reservation for a particular period from being set for all of a plurality of apparatuses and improving convenience for a general user who does not use an priority reservation service, a method of processing priority reservation therefor, and a storage medium for storing a program.

In a first aspect of the present invention, there is provided a processing apparatus that can communicate with external apparatuses, comprising a reservation information storing unit adapted to store reservation information about a reservation for priority use of the processing apparatus and the external apparatuses, a detecting unit adapted to detect the number of apparatuses that are not reserved for priority use during a particular period in the processing apparatus and the external apparatuses with reference to the reservation information, and an instruction issuing unit adapted to issue an instruction not to accept a reservation for priority use during the particular period to apparatuses that are not reserved for priority use during the particular period in the processing apparatus and the external apparatuses if the number detected by the detecting unit is a predetermined number.

The reservation information storing unit can store the reservation information about a plurality of external apparatuses.

The processing apparatus can further comprise an accepting unit adapted to accept a reservation request for a reservation for priority use of the external apparatuses during the particular period from the external apparatuses, a determining unit adapted to determine the reservation availability with reference to reservation information stored in the reservation information storing unit according to the reservation request, and an update unit adapted to add reservation information indicating a reservation for priority use of the external apparatuses during the particular period to the reservation information storing unit if the determining unit determines that a reservation is available.

In a second aspect of the present invention, there is provided a processing apparatus that can communicate with external apparatuses, comprising a reservation information collecting unit adapted to collect reservation information about a reservation for priority use of the external apparatuses from the external apparatuses, a detecting unit adapted to detect the number of apparatuses that are not reserved for priority use during a particular period in the processing apparatus and the external apparatuses with reference to the reservation information collected by the reservation information collecting unit, and an instruction issuing unit adapted to issue an instruction not to accept a reservation for priority use during the particular period to apparatuses that are not reserved for priority use during the particular period in the processing apparatus and the external apparatuses if the number detected by the detecting unit is a predetermined number.

In a third aspect of the present invention, there is provided an priority reservation processing method applied to a processing apparatus that can communicate with external apparatuses, comprising a reservation information storing step of storing reservation information about a reservation for priority use of a plurality of apparatuses, a detecting step of detecting the number of apparatuses that are not reserved for priority use during a particular period with reference to the reservation information, and an instruction issuing step of issuing an instruction not to accept a reservation for priority use during the particular period to apparatuses that are not reserved for priority use during the particular period if the number detected in the detecting step is a predetermined number.

In a fourth aspect of the present invention, there is provided an priority reservation processing method applied to a processing apparatus that can communicate with external apparatuses, comprising a reservation information collecting step of collecting reservation information about a reservation for priority use of a plurality of apparatuses from the plurality of apparatuses, a detecting step of detecting the number of apparatuses that are not reserved for priority use during a particular period with reference to the reservation information collected in the reservation information collecting step, and an instruction issuing step of issuing an instruction not to accept a reservation for priority use during the particular period to apparatuses that are not reserved for priority use during the particular period if the number detected in the detecting step is a predetermined number.

In a fifth aspect of the present invention, there is provided a storage medium for storing a program for causing a computer to execute an priority reservation processing method applied to a processing apparatus that can communicate with external apparatuses, the program comprising a reservation information storing module for storing reservation information about a reservation for priority use of a plurality of apparatuses, a detecting module for detecting the number of apparatuses that are not reserved for priority use during a particular period with reference to the reservation information, and an instruction issuing module for issuing an instruction not to accept a reservation for priority use during the particular period to apparatuses that are not reserved for priority use during the particular period if the number detected by the detecting module is a predetermined number.

In a sixth aspect of the present invention, there is provided a storage medium for storing a program for causing a computer to execute an priority reservation processing method applied to a processing apparatus that can communicate with external apparatuses, the program comprising a reservation information collecting module for collecting reservation information about a reservation for priority use of a plurality of apparatuses from the plurality of apparatuses, a detecting module for detecting the number of apparatuses that are not reserved for priority use during a particular period with reference to the reservation information collected by the reservation information collecting module, and an instruction issuing module for issuing an instruction not to accept a reservation for priority use during the particular period to apparatuses that are not reserved for priority use during the particular period if the number detected by the detecting module is a predetermined number.

Further features and advantages of the present invention will become apparent from the following detailed description of exemplary embodiments with reference to the attached drawings.

BRIEF DESCRIPTION OF THE DRAWINGS

FIG. 3 is a diagram showing an example of contents of a reservation management table in FIG. 2.

FIG. 12A is a drawing showing a reservation status of the printing system before a certain exclusive reservation is made; and FIG. 12B is a diagram showing a reservation status of the printing system after the certain exclusive reservation is made.

FIG. 13A is a drawing showing a format of a reservation request command used in the exclusive reservation processing; FIG. 13B is a drawing showing a format of a reservation response command used in the exclusive reservation processing; and FIG. 13C is a diagram showing a format of a reservation forbid command used in the exclusive reservation processing.

FIG. 14A is a drawing showing the initial state of the reservation management table; and FIG. 14B is a diagram showing the state of the reservation management table after acceptance of a reservation.

FIG. 15 is a diagram showing a state of the reservation management table after an exclusive reservation is forbidden.

FIG. 24 is a diagram showing an example of a reservation state temporary storage table in FIG. 23.

FIG. 25 is a schematic diagram showing the flow of exclusive reservation processing applied on the printing system according to the second embodiment of the present invention.

FIG. 27A is a diagram showing a format of a reservation state confirmation command used in the exclusive reservation processing; FIG. 27B is a drawing showing a format of a reservation state response command used in the exclusive reservation processing; and FIG. 27C is a diagram showing a format of a reservation forbid command used in the exclusive reservation processing.

FIG. 28A is a diagram showing the initial state of the reservation management table; and FIG. 28B is a diagram showing the state of the reservation management table after acceptance of a reservation.

FIG. 29 is a diagram showing a state of the reservation management table after the exclusive reservation is forbidden.

FIG. 30 is a flowchart showing the reservation execution processing according to the second embodiment.

DETAILED DESCRIPTION OF THE PREFERRED EMBODIMENTS

The present invention will now be described in detail with reference to the drawings showing preferred embodiments thereof.

<Configuration of Printing System>

Figure 1:
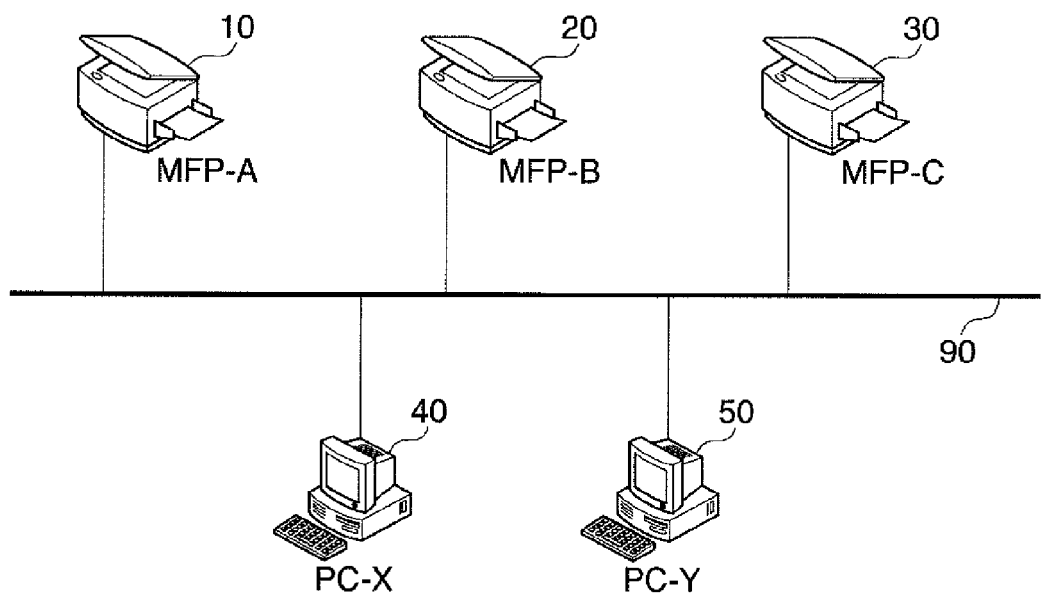
FIG. 1 is a block diagram schematically showing configuration of a printing system including digital multifunction peripherals as processing apparatuses according to a first embodiment of the present invention.

FIG. 1 is a block diagram schematically showing configuration of a printing system including digital multifunction peripherals as processing apparatuses according to a first embodiment of the present invention.

In the printing system, digital multifunction peripherals 10, 20 and 30 (MFP-A, B and C) and host computers 40 and 50 (PC-X and Y) are connected to one another via a local area network (LAN) 90.

Each of the digital multifunction peripherals 10, 20 and 30 is equipped with a scanner or a printer and has an image input/output function to input an image from an original and print out an image on paper. The peripherals can also print the inputted images on paper, store the inputted images as digital data, or transfer the digital data through the LAN to other peripherals. The digital multifunction peripherals can further receive print data from the host computers 40 and 50 or image information from other digital multifunction peripherals and print out images on paper.

As described above, in the printing system, the peripherals are connected to one another via the LAN 90 so that processing by cooperative peripherals is enabled in addition to the conventional processing by a sole peripheral.

<Configuration of Controller Unit>

Figure 2:
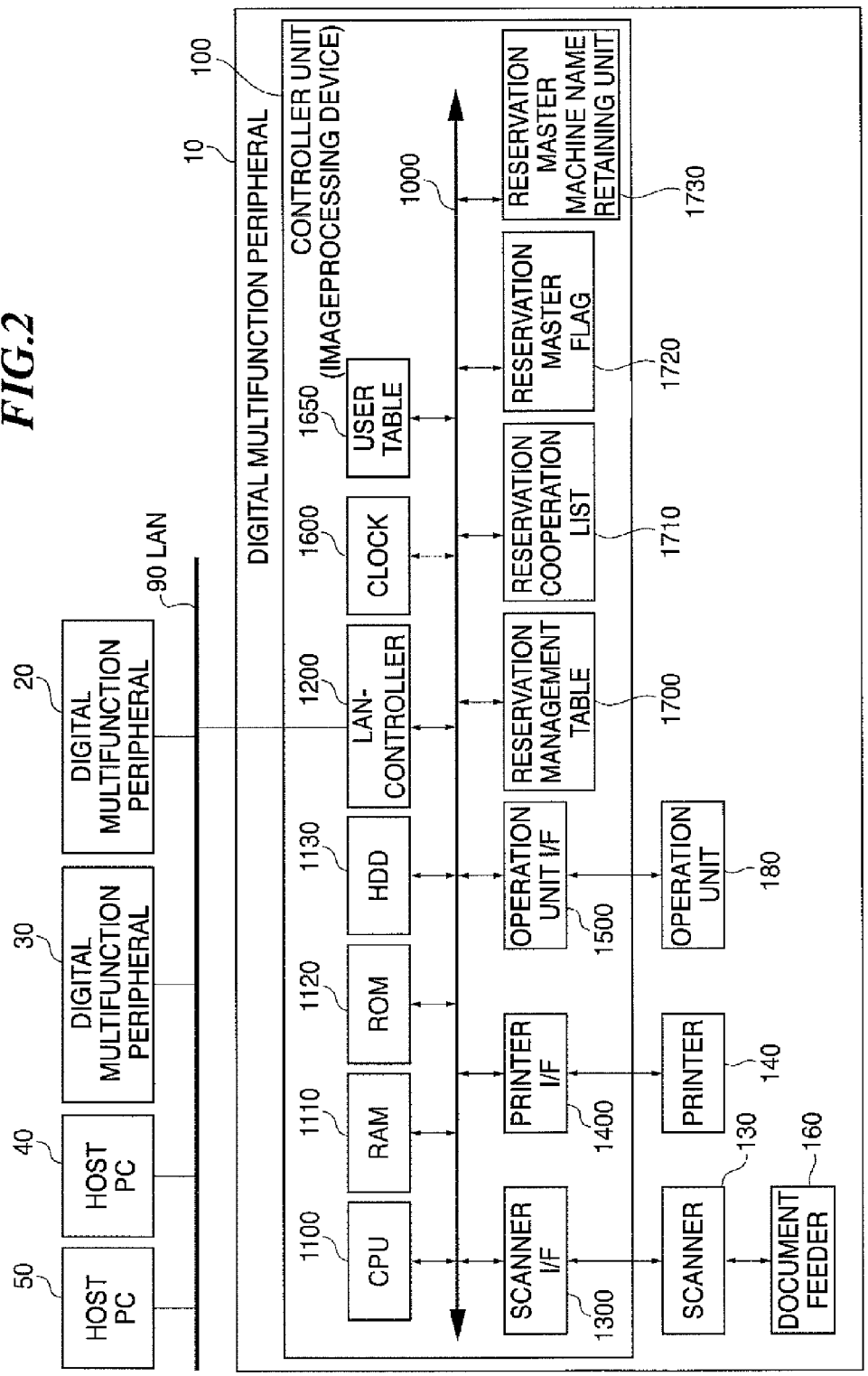
FIG. 2 is a block diagram schematically showing configuration of a controller unit of one of the digital multifunction peripherals in FIG. 1.

FIG. 2 is a block diagram schematically showing configuration of a controller unit of one of the digital multifunction peripherals in FIG. 1.

A controller unit 100 is connected to a scanner 130 or a printer 140 as well as connected to the LAN 90 to control input/output of image data or device information.

Internal modules of the controller unit 100 are connected to one another via an internal bus 1000. A CPU 1100 is a processor for controlling the entire system. A RAM 1110 is a system work memory to operate the CPU 1100 and is also an image memory for temporarily storing image data.

A ROM 1120 is a boot ROM that stores a boot program for the system. An HDD 1130 is a hard disk drive that stores a system software (bootable), image data, a software counter value and the like. The system software is a program to implement a copy, scan or printer function, which is deployed on the RAM 1110 for operation.

The software counter value has a counter region for each paper size and a counter region for each data processing volume. The value is calculated and counted up using an reference capacity value being predetermined as the point of reference based on the number of outputted images or the data volume processed by the CPU 1100. The counter value is retained not only by the HDD 1130, but an EEPROM (not shown) or the like that can store and retain the value after the power-off can have a storage region for the value.

A LAN-controller 1200 (Local Area Network Controller), which connects to the LAN 90, inputs/outputs image data or inputs/outputs information about peripheral control. The LAN-controller 1200 can also receive image data to be outputted from the host computers 40 and 50 and other digital multifunction peripherals 20 and 30 on the network to output an image, or send image data inputted by the LAN-controller 1200 itself.

A printer I/F 1400, which connects to the printer 140, communicates with a CPU of the printer 140 and performs synchronous/asynchronous transformation of image data. A scanner I/F 1300, which connects to the scanner 130, communicates with a CPU of the scanner 130 and performs synchronous/asynchronous transformation of image data. The scanner 130 is also connected to a document feeder 160 that can set a plurality of originals and input the documents continuously.

An operation unit I/F 1500, which is an interface section for an operation unit 180, outputs image data displayed on the operation unit 180. The operation unit I/F 1500 also plays a role of communicating information inputted by a user of the system to the CPU 1100 through the operation unit 180. An input operation on the operation unit 180 is recognized and processed by a program executed by the CPU 1100 through the operation unit I/F 1500 for configuring the settings of the entire peripheral or making an instruction to execute a function so that copy or scan processing can be performed.

A clock 1600 provides date and time information. The clock 1600 can be accessed from the CPU 1100, and allows a user to use an exclusive reservation service based on reservation information and date and time information as the features of this embodiment. The clock 1600, which is configured such that back up by a battery (not shown) is possible, retains date and time information after power-off of the peripheral.

A user table 1650 is a table for management of users who use the peripheral. A reservation management table 1700, which is a characteristic part of this embodiment, retains exclusive reservation information. Information managed in the table varies depending on a set value of a reservation master flag 1720. The details will be described later.

A reservation cooperation list 1710 is a list that retains information to specify digital multifunction peripherals cooperating in the exclusive reservation service, in which a format of the information to specify the digital multifunction peripherals is not limited to a particular one. For example, the information can include a specific name or an IP address of a peripheral. The operation unit 180 sets each peripheral when the printing system is installed.

The reservation master flag 1720 is a flag to retain information of "true" when a peripheral is set as a master machine or information of "false" when the peripheral is set as a reservation slave machine in the exclusive reservation service. The flag can be set through the operation unit 180. The reservation master flag 1720 retains "false" as its initial value, while it is set to "true" for only a peripheral that is set as a master machine when the printing system is installed.

A reservation master machine name retaining unit 1730, which retains information to specify a master machine in the exclusive reservation service, is used to specify a peripheral that is requested for reservation. The operation unit 180 comprises a touch panel, push buttons and the like. A touch panel serves as an image display and an input device for a user to input instructions by touching the surface. The push buttons direct an operation such as input of a numeric value through numeric keys or start of copy processing. The user table 1650 is a table to retain a pair of a user name and a password. A reservation cooperation list 1710 is a list to retain specific names of peripherals cooperating in the exclusive reservation service.

<Reservation Management Table>

FIG. 3 is a diagram showing an example of contents of the reservation management table 1700 in FIG. 2.

As shown in FIG. 3, the reservation management table 1700 is a list of a reservation date, a reservation starting time, a reservation termination time, a reservation status, a peripheral name and a user name.

The "reserved" in the reservation status indicates that a reservation is made, while the "forbidden" indicates that an exclusive reservation cannot be made. The exclusive reservation service according to this embodiment is accomplished by a master machine and a plurality of slave machines. In the reservation management table 1700 in the master machine, a reservation status of the master machine itself and reservation statuses of all cooperative peripherals are managed using the single table. In a slave machine, only a reservation status of the slave machine itself is managed using the table.

<User Operation in Exclusive Reservation Service>

Next, a user operation in the exclusive reservation service in this embodiment will be described with reference to FIGS. 4 to 10. FIGS. 4 to 10 show a user interface (UI) for the operation in the exclusive reservation service according to this embodiment, i.e., display of a touch panel 181 of the operation unit 180.

(A) Ready State

Figure 4:
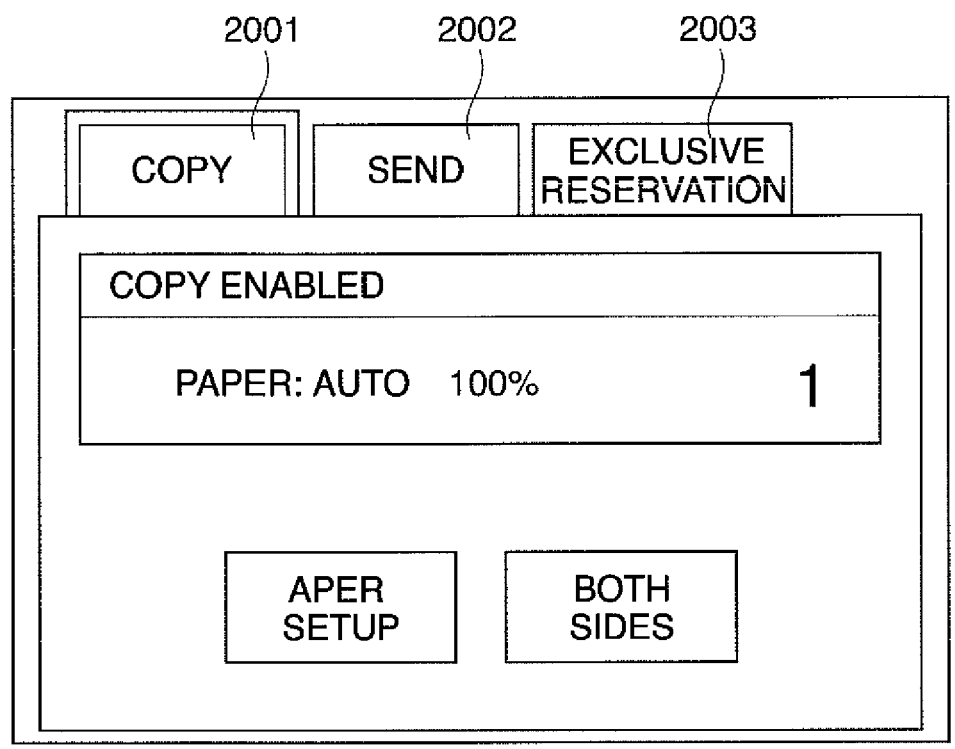
FIG. 4 is a diagram showing a ready screen of the digital multifunction peripheral.

FIG. 4 is a diagram showing a ready screen of the digital multifunction peripheral.

A ready screen of the above digital multifunction peripheral displays "copy enabled", as shown in FIG. 4, which indicates the digital multifunction peripheral is in a ready state that copy operation is enabled.

In FIG. 4, reference numeral 2001 denotes a copy tab; 2002 a send tab; 2003 an exclusive reservation tab. When a user presses a touch panel in each of the tabs, a menu switches such that each function is available. A user presses the copy tab 2001 to use a copy function. A user presses the send tab 2002 to send data of a scanned image to another peripheral on the LAN 90. A user presses the exclusive reservation tab 2003 to use the exclusive reservation service as the features of this embodiment.

(B) Login to Exclusive Reservation

Figure 5:
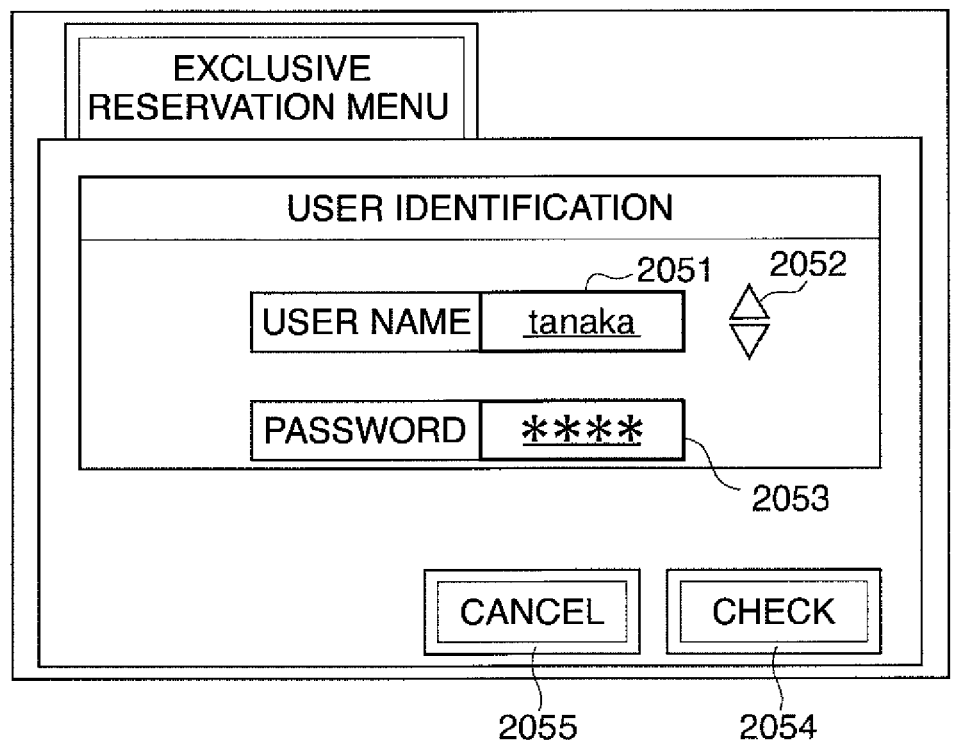
FIG. 5 is a diagram showing a user login screen to use an exclusive reservation service in the digital multifunction peripheral.

FIG. 5 is a diagram showing a user login screen to use the exclusive reservation service in the digital multifunction peripheral.

As shown in FIG. 5, the user login screen displays a user name in an area 2051, and scroll buttons 2052 are used to select a user name. User names are selectable based on user names retained in the user table 1650. A password for login is inputted using numeric keys. A password is not displayed but masked with symbols "★".

A user selects his/her user name, inputs his/her password, and then presses a check button 2054 to proceed to an available period check screen in FIG. 6 described below. The user presses a cancel button 2055 to stop the exclusive reservation service and return to the ready screen in FIG. 4.

(C) Checking of Exclusive Reservation Available Period

Figure 6:
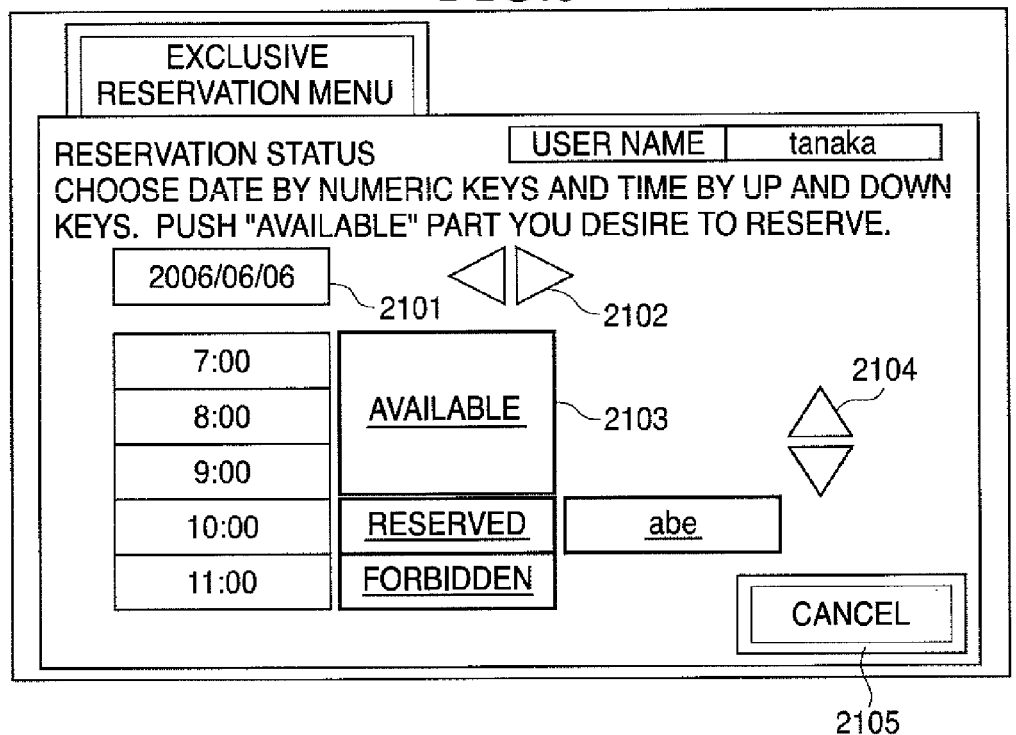
FIG. 6 is a diagram showing an available period check screen to use the exclusive reservation service in the digital multifunction peripheral.

FIG. 6 is a diagram showing an available period check screen to use the exclusive reservation service in the digital multifunction peripheral.

A reservation date is inputted using the numeric keys of the operation unit 180. The inputted date is reflected on a date display part 2101. A date can be changed before and after it through scroll buttons 2102. When a reservation date is selected, a reservation status is displayed. A time period is displayed by moving scroll buttons 2104 up and down, and a user checks availability during a desired time period. An example in FIG. 6 indicates that the peripheral is in an available state from 7:00 to 10:00, it is reserved from 10:00 to 11:00, and an exclusive reservation for it is forbidden from 11:00 to 12:00. A user presses a region 2103 indicating an available state to proceed to a screen for an exclusive reservation for that time period.

A user may wish to cancel the use of the exclusive reservation service if a peripheral is reserved during a desired time. In that case, the user can press a cancel button 2105 to return to the ready screen in FIG. 4.

(D) Execution of Exclusive Reservation

Figure 7:
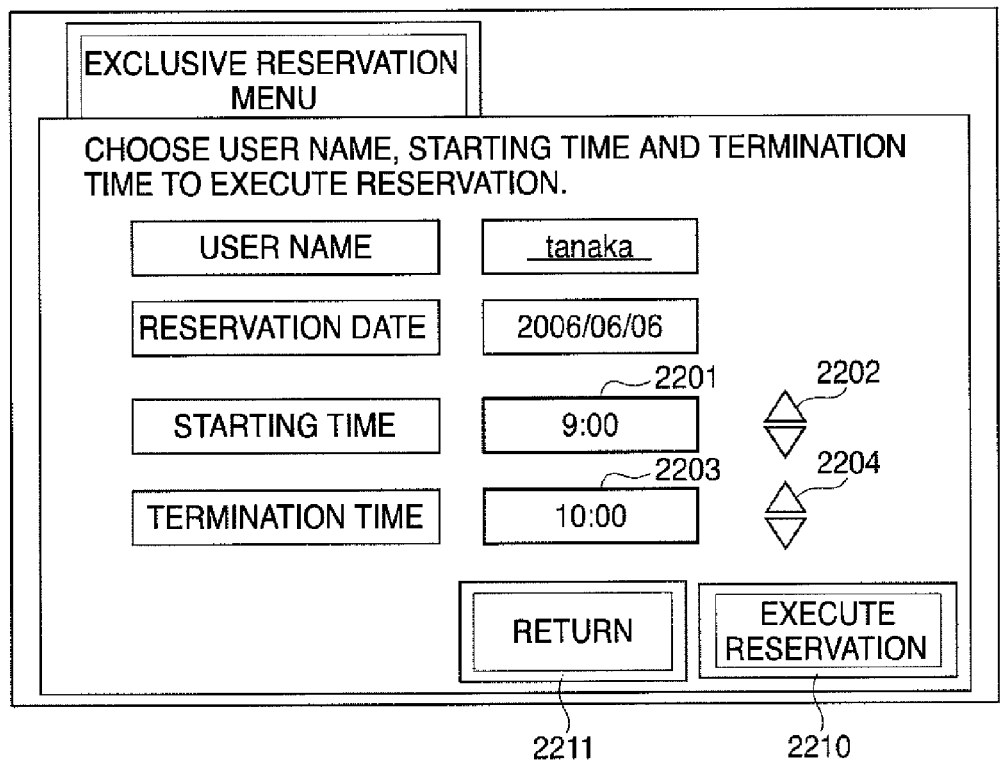
FIG. 7 is a diagram showing a reservation execution screen to use the exclusive reservation service in the digital multifunction peripheral.

FIG. 7 is a diagram showing a reservation execution screen to use the exclusive reservation service in the digital multifunction peripheral.

On the reservation execution screen, a time period to be reserved is fine adjusted based on a time period selected on the available period check screen in FIG. 6, and the reservation is executed. In FIG. 7, reference numeral 2201 denotes a starting time; 2203 a termination time. The starting time can be adjusted within a range of an available time period by operating scroll buttons 2202. The termination time can be adjusted within a range of an available time period by operating scroll buttons 2204. When a desired time period is decided using the scroll buttons 2202 and 2204 and a reservation execution button 2210 is pressed, the reservation is executed.

If a user wish to check and change an available period again, the user presses a return button 2211 to return to the available period check screen in FIG. 6.

(E) Checking of Result of Exclusive Reservation

Figure 8:
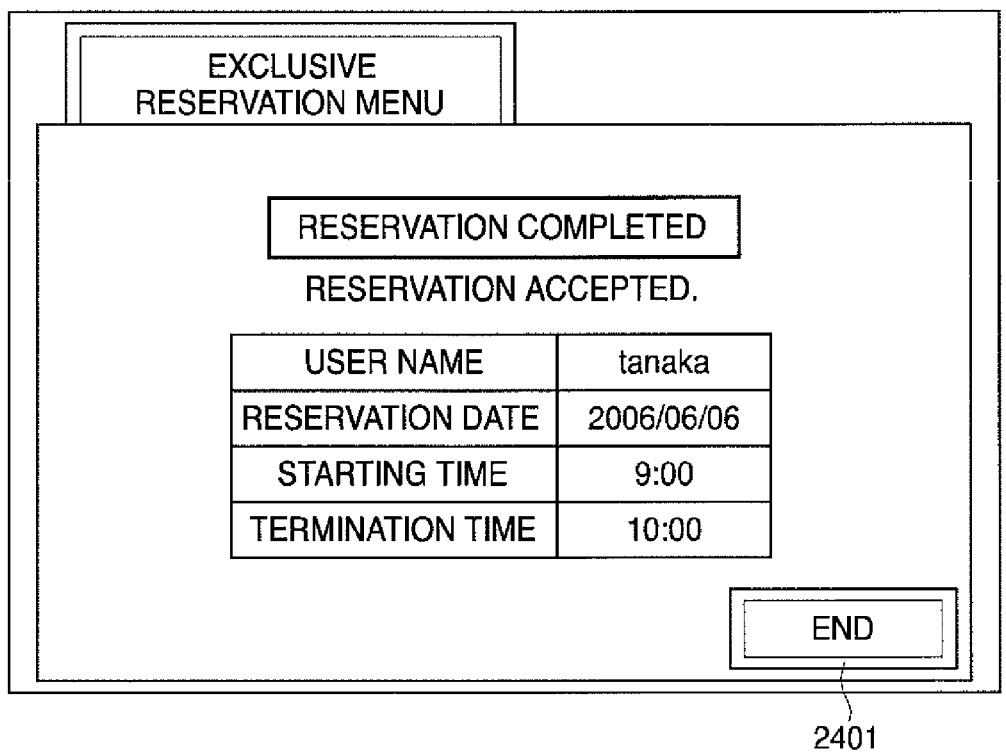
FIG. 8 is a diagram showing a check screen for an execution result of the exclusive reservation to use the exclusive reservation service in the digital multifunction peripheral.
Figure 9:
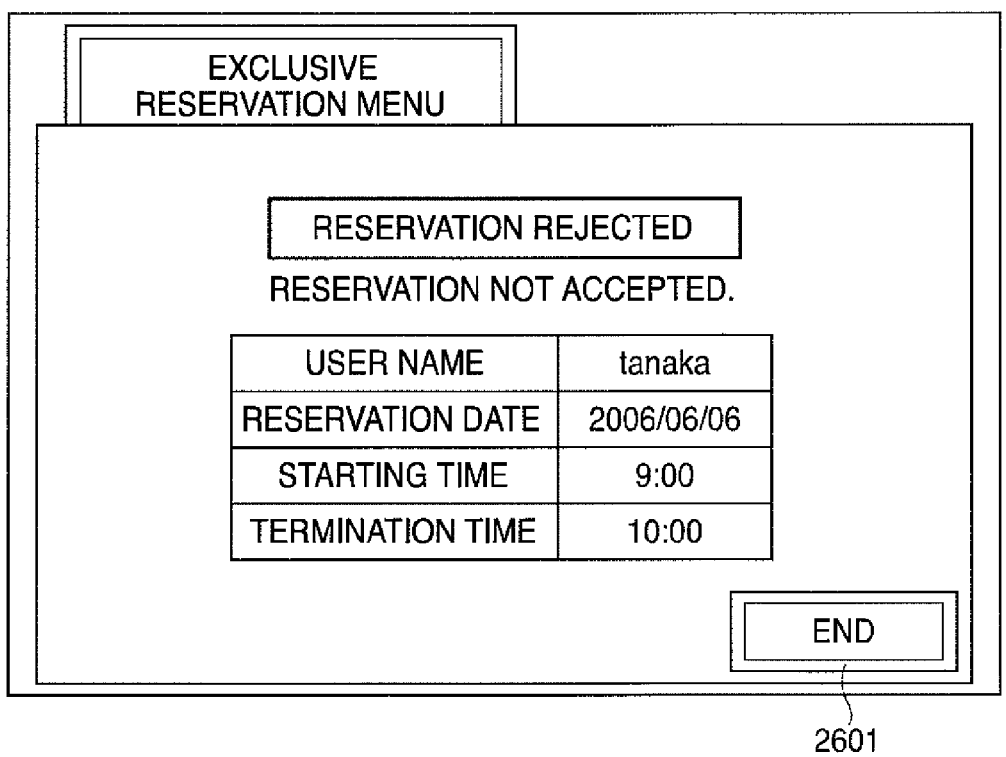
FIG. 9 is a diagram showing a check screen for an execution result of the exclusive reservation to use the exclusive reservation service in the digital multifunction peripheral.

FIGS. 8 and 9 are diagrams showing check screens for execution results of the exclusive reservation to use the exclusive reservation service in the digital multifunction peripheral. Particularly, FIG. 8 shows a screen displayed when a reservation is normally accepted, while FIG. 9 shows a screen displayed when the reservation is not accepted. On either of the screens, an end button 2401 or 2601 is pressed down to return to the ready screen in FIG. 4.

(F) State at Reservation Starting Time

Figure 10:
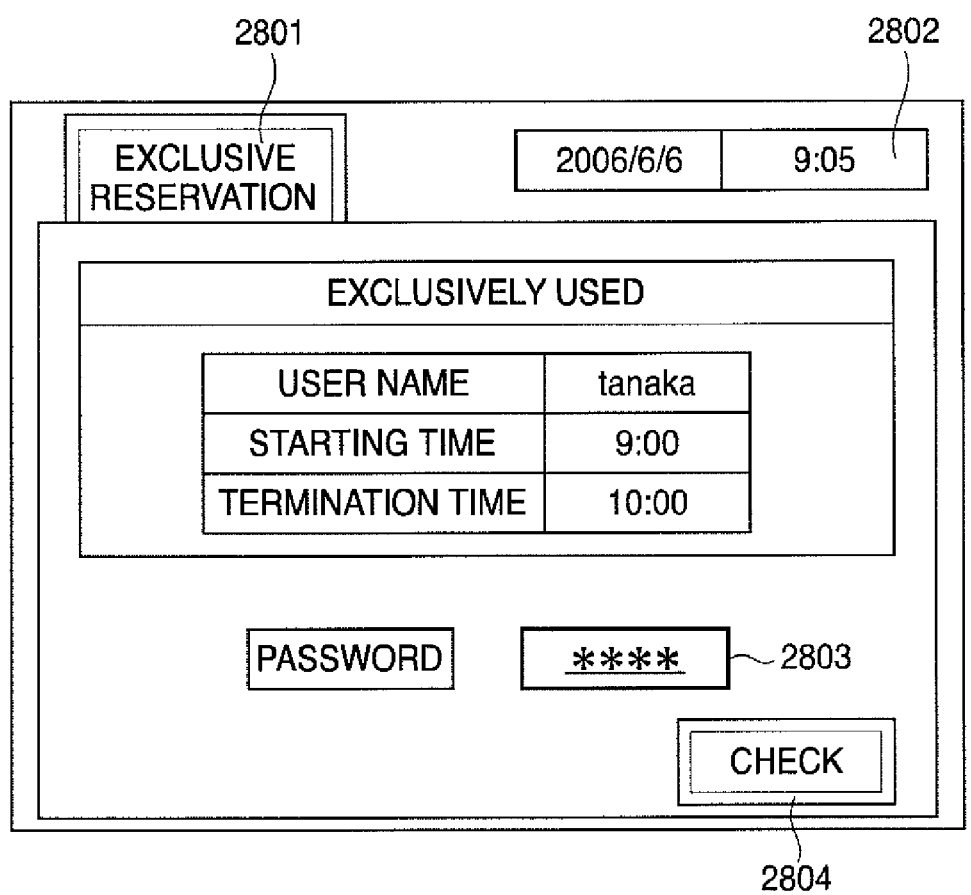
FIG. 10 is a diagram showing a screen displayed when it is an exclusive reservation time to use the exclusive reservation service in the digital multifunction peripheral.

FIG. 10 is a diagram showing a screen displayed when it is a reservation starting time in the digital multifunction peripheral.

When it is a reservation starting time, a user name, a reservation starting time, and a reservation termination time are displayed on the screen, as shown in FIG. 10.

In FIG. 10, reference numeral 2801 denotes an exclusive reservation tab, which indicates that the peripheral is in exclusive use based on an exclusive reservation. Reference numeral 2802 denotes a current date and time. The display screen example in FIG. 10 indicates that the current date and time are "06/06/2006" and "9:05", respectively.

A user who executed an exclusive reservation inputs a password to a password display part 2803 using the numeric keys to use the peripheral, and presses down a check button 2804. If a valid password is inputted, then the ready screen in FIG. 4 is displayed so that the user can exclusively use the digital multifunction peripheral from a reservation starting time to a reservation termination time with the exclusion of jobs by other users.

<Exclusive Reservation Processing Flow>

Next, the flow of processing executed in the exclusive reservation service according to the first embodiment (hereinafter, referred to as exclusive reservation processing) will be described with reference to FIGS. 11 to 15.

Figure 11:
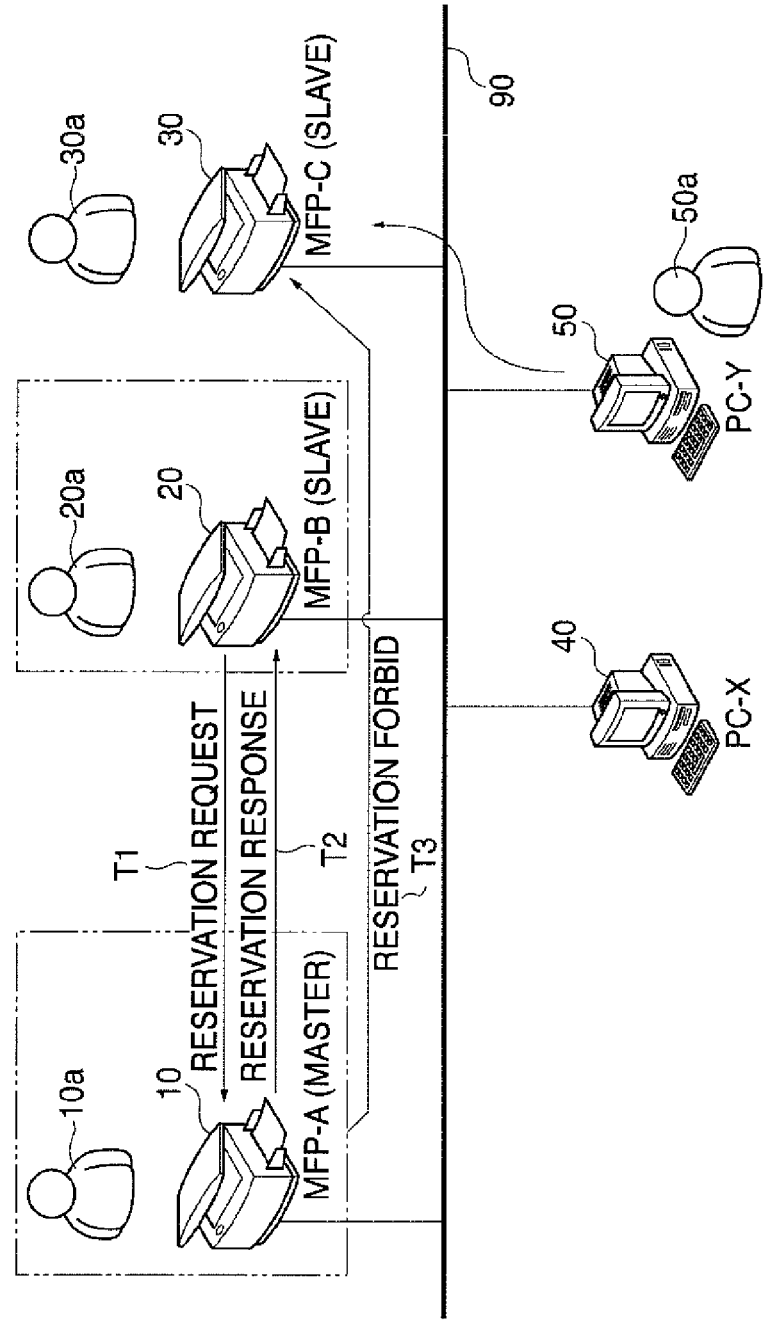
FIG. 11 is a schematic diagram showing the flow of exclusive reservation processing applied on the printing system in FIG. 1.

FIG. 11 is schematic diagram showing the flow of the exclusive reservation processing applied on the printing system in FIG. 1. FIG. 12A is a drawing showing a reservation status of the printing system before a certain exclusive reservation is made; and FIG. 12B is a diagram showing a reservation status of the printing system after the certain exclusive reservation is made. A user attempts an exclusive reservation of the MFP-B in the state shown in FIG. 12A.

FIG. 13A is a drawing showing a format of a reservation request command used in the exclusive reservation processing; FIG. 13B is a drawing showing a format of a reservation response command used in the exclusive reservation processing; and FIG. 13C is a diagram showing a format of a reservation forbid command used in the exclusive reservation processing. FIG. 14A is a drawing showing the initial state of the reservation management table 1700; and FIG. 14B is a diagram showing the state of the reservation management table 1700 after acceptance of a reservation. FIG. 15 is a diagram showing a state of the reservation management table 1700 after an exclusive reservation is forbidden.

In FIG. 11, the digital multifunction peripheral 10 (MFP-A) is assigned as a master machine for the exclusive reservation service, and the digital multifunction peripherals 20 (MFP-B) and 30 (MFP-C) are assigned as slave machines in the exclusive reservation.

Suppose that a user 20a makes an exclusive reservation implying that the user wishes to exclusively use the digital multifunction peripheral 20 from 9:00 to 10:00 if a user 10a has completed an exclusive reservation of the digital multifunction peripheral 10 from 9:00 to 10:00, for example. Then, the exclusive reservation of the digital multifunction peripheral 20 is completed and the exclusive reservation of the digital multifunction peripheral 30 from 9:00 to 10:00 is forbidden to be accepted (see FIG. 12A showing a reservation status before an exclusive reservation is made and FIG. 12B showing a reservation status after the exclusive reservation is made). Accordingly, exclusive reservations of all peripherals (here, the MFP-A, MFP-B, and MFP-C) are prevented during a certain time period. In the case shown in FIG. 12B, an exclusive reservation of the MFP-C is forbidden from 9:00 to 10:00. As a result, an exclusive reservation during that time period is not accepted.

The following will describe exclusive reservation processing in this embodiment to obtain the result as above using the following three phases in that order:
(A) Reservation Request Phase
(B) Reservation Response Phase
(C) Reservation Forbid Phase
   (A) Reservation Request Phase The user 20a operates the operation unit 180 of the digital multifunction peripheral 20 and executes an exclusive reservation according to the procedures in FIGS. 4 to 7 described before. Then, the digital multifunction peripheral 20 transmit a reservation request command to the digital multifunction peripheral 10 (MFP-A) being a master machine (T1 in FIG. 11). A reservation request command includes parameters of a user name, a reservation date, a reservation starting time and a reservation termination time, as shown in FIG. 13A.

In a stage that the reservation request command is transmitted to the digital multifunction peripheral 10, the reservation management table 1700 is in a state in FIG. 14A.

(B) Reservation Response Phase

The digital multifunction peripheral 10 that received the reservation request command checks whether or not a time period indicated in the reservation request command is available for a reservation with reference to the reservation management table 1700, and answers the digital multifunction peripheral 20 in a reservation response command (T2 in FIG. 11). A reservation response command includes parameters of a user name, a reservation date, a reservation starting time, a reservation termination time and a reservation availability status, as shown in FIG. 13B.

A reservation availability status reflects "OK" or "NG" as a result of checking the reservation management table 1700 of a master machine. If an exclusive reservation is available, a reservation availability status is "NG". Otherwise, if an exclusive reservation is unavailable, a reservation availability status is "OK". The digital multifunction peripheral 20 that received the reservation response command is in either state of reservation completed or reservation rejected, as shown in FIGS. 8 and 9 described before. In this embodiment, the digital multifunction peripheral 10 transmits a reservation response command containing "OK" to the digital multifunction peripheral 20, and then the digital multifunction peripheral 20 is in a reservation completed state. In this stage, the reservation management table 1700 is in a state shown in FIG. 14B.

Then, the digital multifunction peripherals 10 and 20 add the exclusive reservation to the reservation management table 1700. That is, the digital multifunction peripheral 10 as a master machine adds a reservation record indicating "reservation date: 2006/06/06, reservation starting time: 9:00, reservation termination time: 10:00, peripheral name: MFP-B (digital multifunction peripheral 20), user name: tanaka". The digital multifunction peripheral 20 as a slave machine adds a reservation record indicating "reservation date: 2006/06/06, reservation starting time: 9:00, reservation termination time: 10:00, peripheral name: MFP-B (digital multifunction peripheral 20), user name: tanaka".

(C) Reservation Forbid Phase

The digital multifunction peripheral 10, acting via its CPU 1100 and as a master machine, checks, as a result of receiving a reservation request command, whether or not the number of the peripherals that have not exclusively reserved yet for a time period indicated in the reservation request command is one. If the number is one as a result of the checking, the peripheral 10, acting via its CPU 1100, transmits a reservation forbid command to the one remaining peripheral (T3 in FIG. 11). Although it is checked in this embodiment whether or not the number of peripherals that have not been exclusively reserved is one, it is needless to say that it can be checked whether or not the number of peripherals that have not been exclusively reserved is a predetermined number (a number of one or more).

in this embodiment, a reservation for a time period from 9:00 to 10:00 is applied to the digital multifunction peripheral 20; as a result, a peripheral that has not been exclusively reserved during the time period is only the digital multifunction peripheral 30 (MFP-C). So the digital multifunction peripheral 10 transmits a reservation forbid command to the digital multifunction peripheral 30. A reservation forbid command includes parameters of a forbidden date, a forbid starting time, and a forbid termination time, as shown in FIG. 13C.

In a stage that a reservation forbid command is transmitted to the digital multifunction peripheral 30, the reservation management table 1700 is in a state in FIG. 15. The digital multifunction peripheral 30 (MFP-C) adds a reservation forbid state to the reservation management table 1700. That is, the peripheral 30 adds a reservation forbid record indicating "reservation date: 2006/06/06, reservation starting time: 9:00, reservation termination time: 10:00, peripheral name: MFP-C, status: forbidden" to the digital multifunction peripheral 10 as a master machine. Similarly, the digital multifunction peripheral 30 (MFP-C) as a slave machine also adds a reservation forbid record indicating "reservation date: 2006/06/06, reservation starting time: 9:00, reservation termination time: 10:00, peripheral name: MFP-C, status: forbidden" to the peripheral 30 itself.

<Peripheral Internal Processing for Exclusive Reservation Processing>

(A) Reservation Execution Flow

Figure 16:
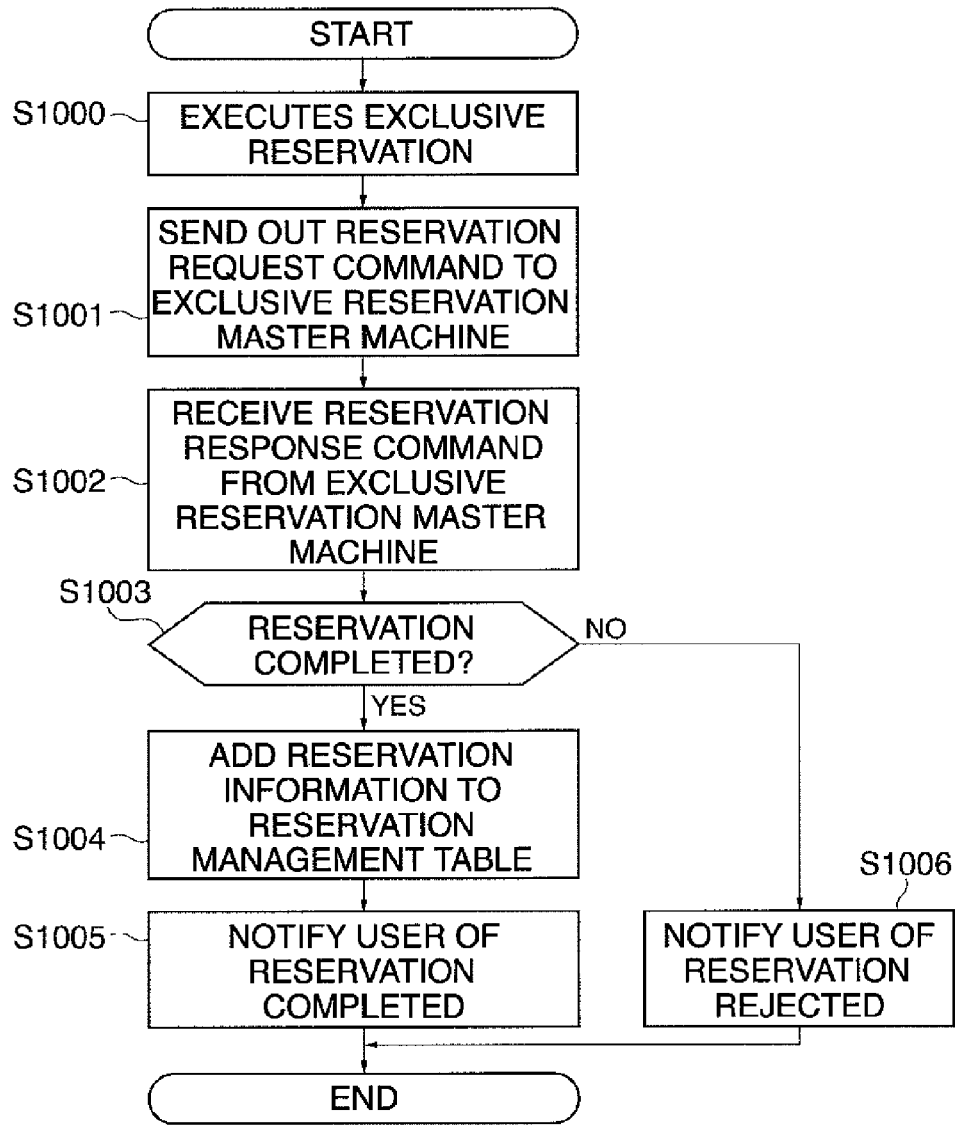
FIG. 16 is a flowchart showing reservation execution processing according to the first embodiment.

FIG. 16 is a flowchart showing reservation execution processing according to the first embodiment.

This processing is executed by a digital multifunction peripheral to which a user operates execution of the exclusive reservation service. In the processing, execution of an exclusive reservation is received through user operation, a reservation request command is transmitted to a master machine, a reservation response command is received, it is determined whether the reservation is completed or rejected, the reservation management table 1700 is updated, and notification is made to the user. The processing will be described below in detail with reference to FIG. 16.

As shown in FIG. 16, first, in step S1000, execution of the exclusive reservation from the user is accepted, and the processing proceeds to step S1001. The step corresponds to a state that the reservation execution button 2210 in FIG. 7 is pressed. In the next step S1001, a reservation request command is sent to a master machine in the exclusive reservation retained in the reservation master machine name retaining unit 1730, and the processing proceeds to step S1002. The step S1001 is the reservation request phase T1 illustrated in FIG. 11.

In step S1002, the reservation response command sent from the master machine in the exclusive reservation service is received and the processing proceeds to step S1003. The step S1002 corresponds to the reservation response phase T2 illustrated in FIG. 11.

In step S1003, it is determined whether or not a status in the reservation response command received from the master machine indicates reservation available. If the status is OK, the processing proceeds to step S1004. If the status is NG, the processing proceeds to step S1006. In step S1004, a reservation record as reservation information is added to the reservation management table 1700, and the processing proceeds to step S1005. In step S1005, the user is notified of reservation completed, and this processing finishes. At this time, the reservation completed screen shown in FIG. 8 is displayed. In step S1006, the user is notified of reservation rejected, and this processing finishes. At this time, the reservation rejected screen shown in FIG. 9 is displayed.

(B) Reservation Acceptance Flow

Figure 17:
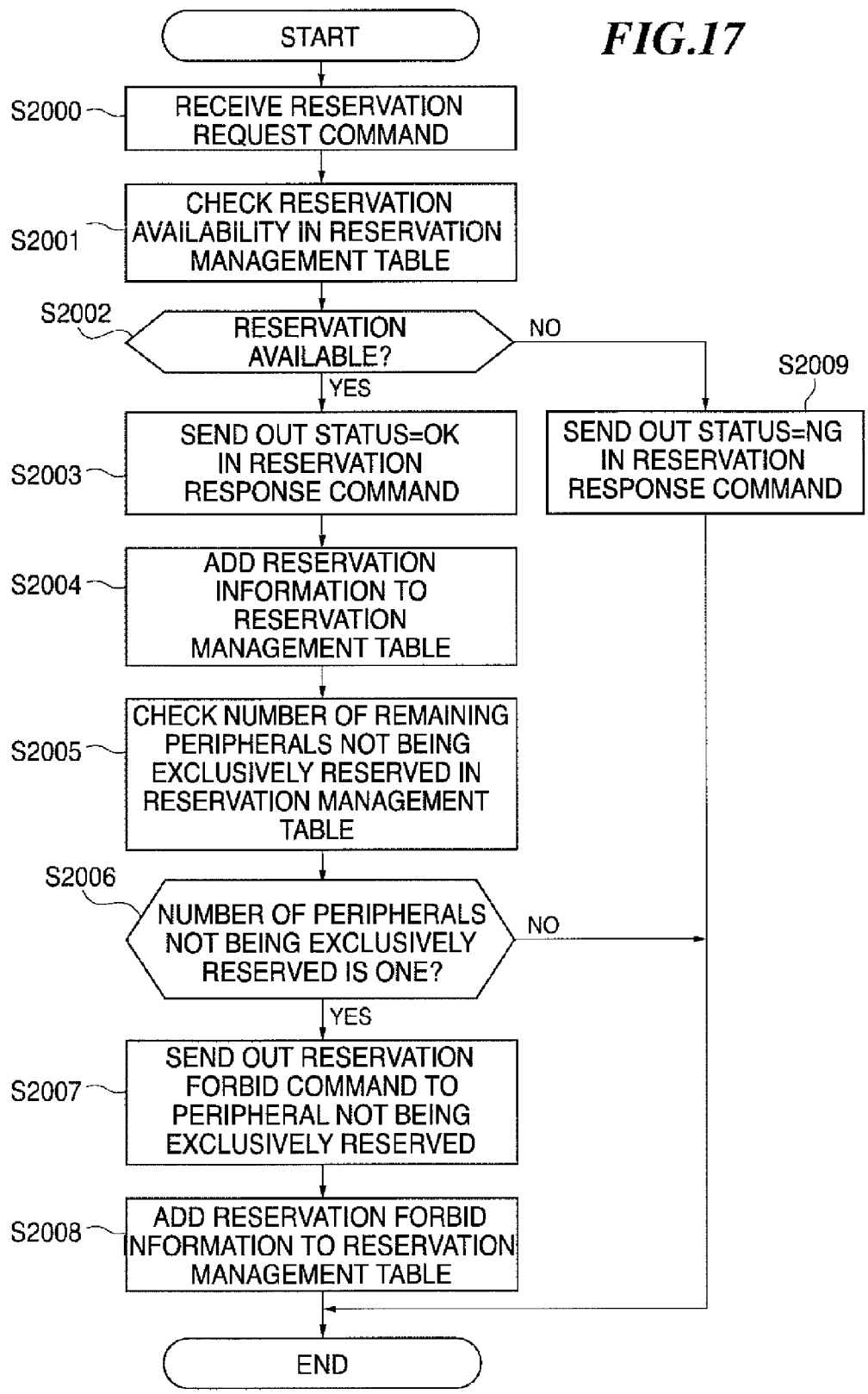
FIG. 17 is a flowchart showing reservation acceptance processing according to the first embodiment.

FIG. 17 is a flowchart showing reservation acceptance processing according to the first embodiment. This processing is executed by a digital multifunction peripheral assigned as a master machine.

In this processing, a reservation request command is received, reservation availability is determined with reference to the reservation management table 1700 and a reservation response command is transmitted. Afterward, when the number of peripherals is one that have not been exclusively reserved for a time period indicated in a reservation request command, a reservation forbid command is transmitted to the single remaining peripheral in peripherals cooperating in an exclusive reservation. The processing will be described below in detail with reference to FIG. 17.

As shown in FIG. 17, in step S2000, a reservation request command is received, and the processing proceeds to step S2001. Next, in step S2001, it is checked whether or not an exclusive reservation is available based on information indicated in the reservation request command and reservation information in the reservation management table 1700. For example, if a time period indicated in the reservation request command is a time period during which an exclusive reservation is forbidden, then it is determined that an exclusive reservation is unavailable. If an exclusive reservation is available, the processing proceeds to step S2003. If an exclusive reservation is unavailable, the processing proceeds to step S2009. If it is determined that a reservation is available in step S2002, first, in step S2003, a reservation response command containing a reservation status "OK" is transmitted to the sender of the reservation request command, and the processing proceeds to step S2004.

In step S2004, a reservation record is added as reservation information to the reservation management table 1700, and the processing proceeds to step S2005. In step S2005, the number of the peripherals that have not exclusively reserved yet during a time period for which reservation is completed is checked with reference to the received reservation request command, a reservation cooperation list and the reservation management table 1700, and the processing proceeds to step S2006.

In step S2006, if the number of the peripherals is one that has not exclusively reserved yet during a time period for which a reservation is completed, the processing proceeds to processing in step S2007. If the number of the peripherals that have not exclusively reserved yet is not one, the processing finishes. In step S2007, a reservation forbid command is transmitted to the single peripheral that has not been exclusively reserved during a time period for which a reservation is completed, and the processing proceeds to step S2008. In the step S2008, a reservation forbid record is added as reservation forbid information to the reservation management table 1700, and this processing finishes.

Otherwise, if it is determined that a reservation is unavailable in the step S2002, a reservation response command containing a reservation status "NG" is transmitted to the sender of the reservation request command in step S2009, and this processing finishes.

(C) Reservation Forbid Flow

Figure 18:
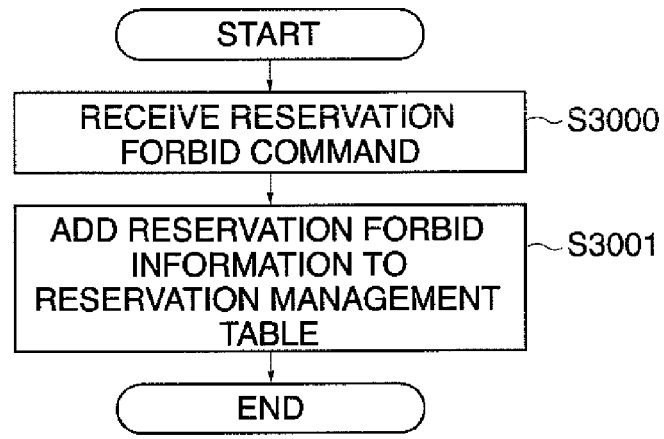
FIG. 18 is a flowchart showing reservation forbid processing according to the first embodiment.

FIG. 18 is a flowchart showing reservation forbid processing according to the first embodiment.

This processing is executed in a digital multifunction peripheral that received a reservation forbid command.

First, in step S3000, the reservation forbid command is received, and the processing proceeds to step S3001. In step S3001, a reservation forbid record is added as reservation forbid information to the reservation management table 1700, and this processing finishes.

<Advantages of This Embodiment>

Figure 19:
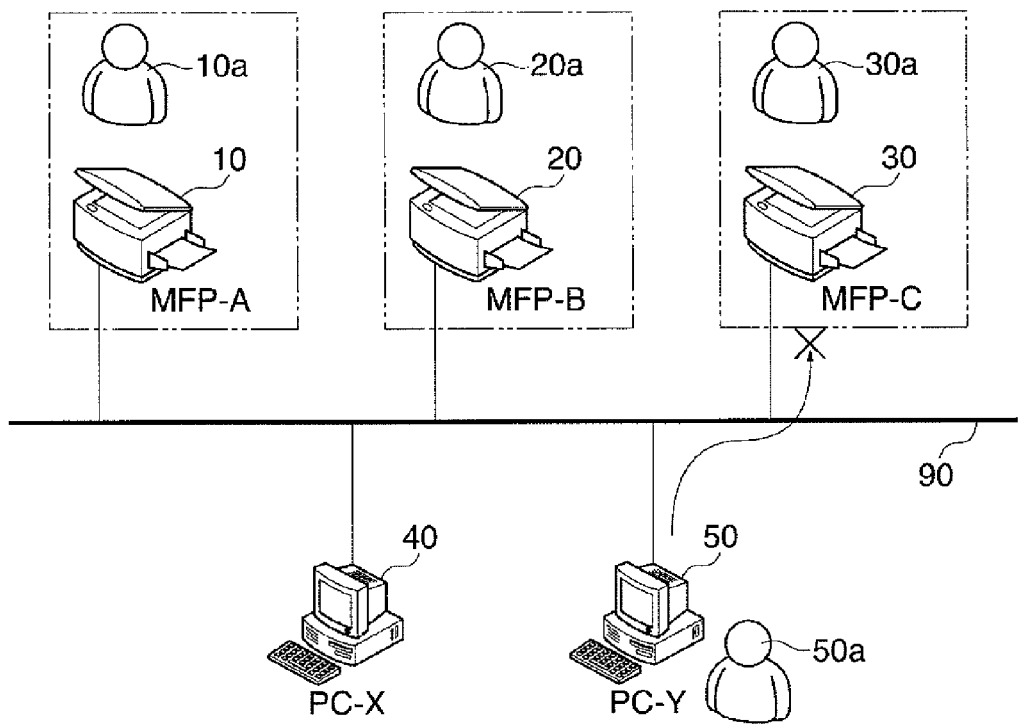
FIG. 19 is a diagram illustrating a problem in a conventional printing system.
Figure 20:
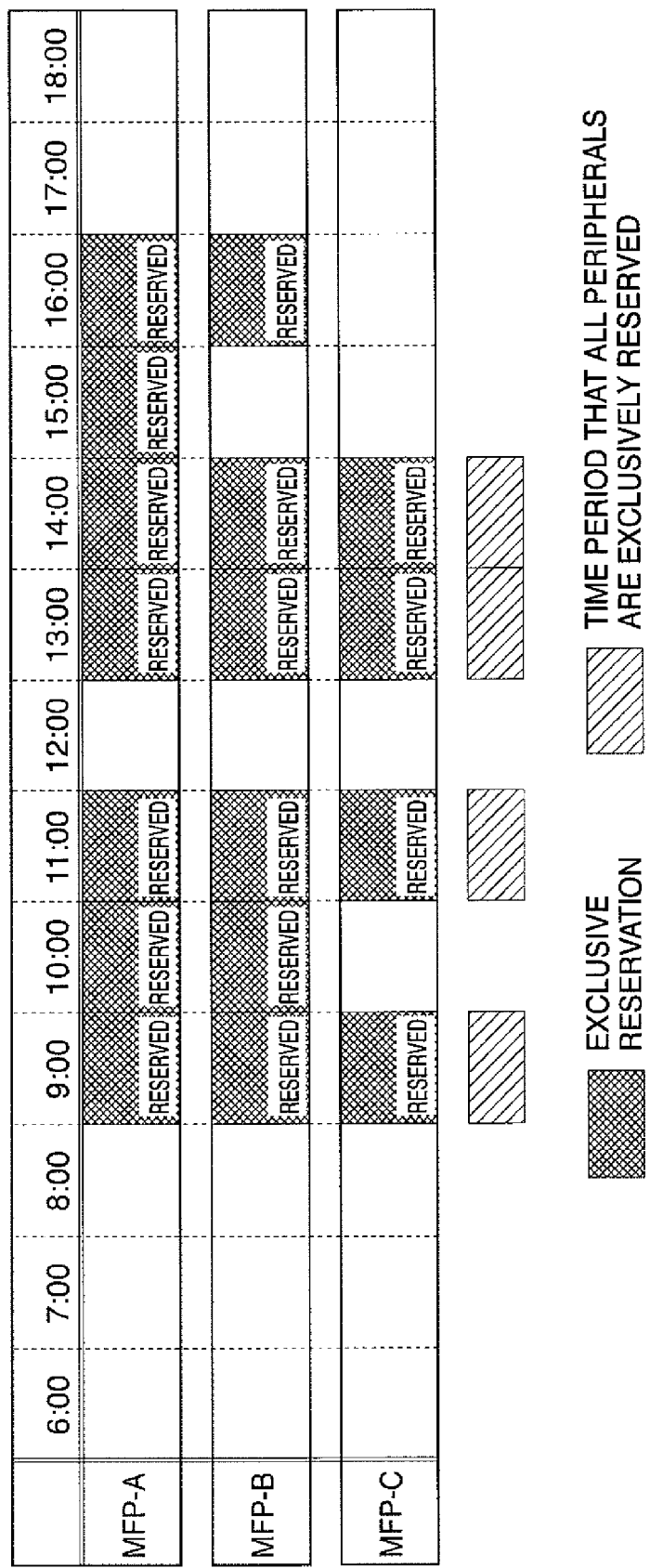
FIG. 20 is a diagram illustrating the problem in the conventional printing system.

FIGS. 19 and 20 are diagrams illustrating a problem in a conventional printing system.

FIGS. 19 and 20 show that there is a time period for which all peripherals are exclusively reserved because the peripherals do not cooperate in an exclusive reservation as in a conventional printing system.

Note that a digital multifunction peripheral 10' (MFP-A') is exclusively used by the user 10a, a digital multifunction peripheral 20' (MFP-B') is exclusively used by the user 20a during a time period from 9:00 shown in FIG. 20 through an exclusive reservation. A digital multifunction peripheral 30' (MFP-C') is exclusively used by the user 30a through an exclusive reservation. During the exclusive use, even if a user 50a wishes to perform print processing on the digital multifunction peripheral 30' from a host computer 50, the printing cannot be performed because the digital multifunction peripheral 30' is exclusively reserved by the user 30a.

The digital multifunction peripheral 10' and the digital multifunction peripheral 20' are also exclusively reserved similarly. Consequently, the user 50a cannot perform print processing until 10:00 when the digital multifunction peripheral 30' is not exclusively reserved (W11 in FIG. 20).

In contrast, the printing system according to this embodiment has the following advantages.

Figure 21:
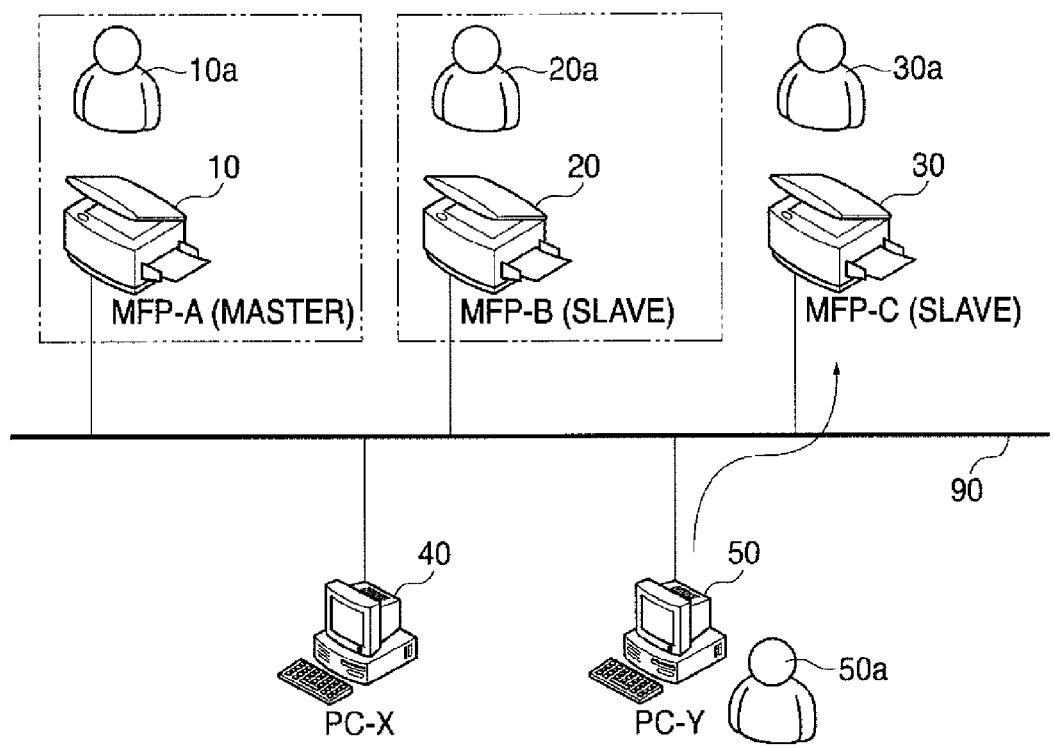
FIG. 21 is a diagram illustrating advantages of the printing system in FIG. 1.
Figure 22:
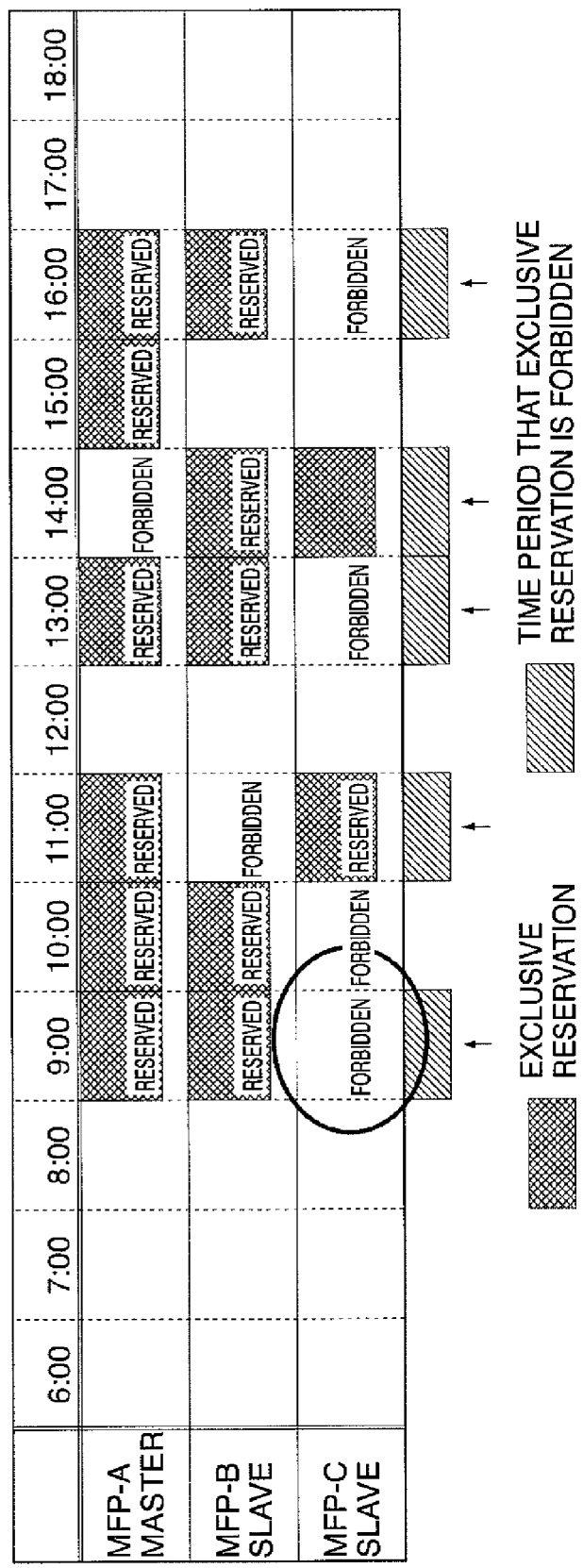
FIG. 22 is a diagram illustrating advantages of the printing system in FIG. 1.

FIGS. 21 and 22 are diagrams illustrating advantages of the printing system in FIG. 1.

FIGS. 21 and 22 show a state that an exclusive reservation of the digital multifunction peripheral 30 (MFP-C) is forbidden and the digital multifunction peripheral 30 is opened to general users as a shared peripheral when the digital multifunction peripherals 10 (MFP-A) and 20 (MFP-B) are reserved.

Note that the digital multifunction peripheral 10 is exclusively used by the user 10a, the digital multifunction peripheral 20 is exclusively used by the user 20a during a time period from 9:00 shown in FIG. 22 through an exclusive reservation. Meanwhile, the digital multifunction peripheral 30 is opened as a shared peripheral because an exclusive reservation is forbidden. As such, the user 50a of the host computer 50 can process printing while the user 30a can use the peripheral 30.

The user 30a cannot exclusively use the digital multifunction peripheral 30. However, the user 30a can avoid circumstances in which a general user who uses the host computer 50 uses the peripheral 30 for print processing for a long time.

As described in the above, according to this embodiment, peripherals cooperate to arrange an exclusive reservation so that a single digital multifunction peripheral always remains that has not been exclusively reserved. This prevents a general user who executes a print job without a reservation from waiting for a long time during execution of a large amount of jobs. This can improve convenience of a general user who does not use the exclusive reservation service of a digital multifunction peripheral.

The first embodiment has described an example of the printing system comprising a master machine that unifies management of reservation information and a plurality of slave machines, each of which only retains reservation information of the peripheral itself. In a second embodiment, a master machine and a slave machine are not distinguished as in the first embodiment. The reservation information is only managed by each peripheral, and peripherals cooperating at reservation execution collect the reservation information.

<Controller Unit>

Figure 23:
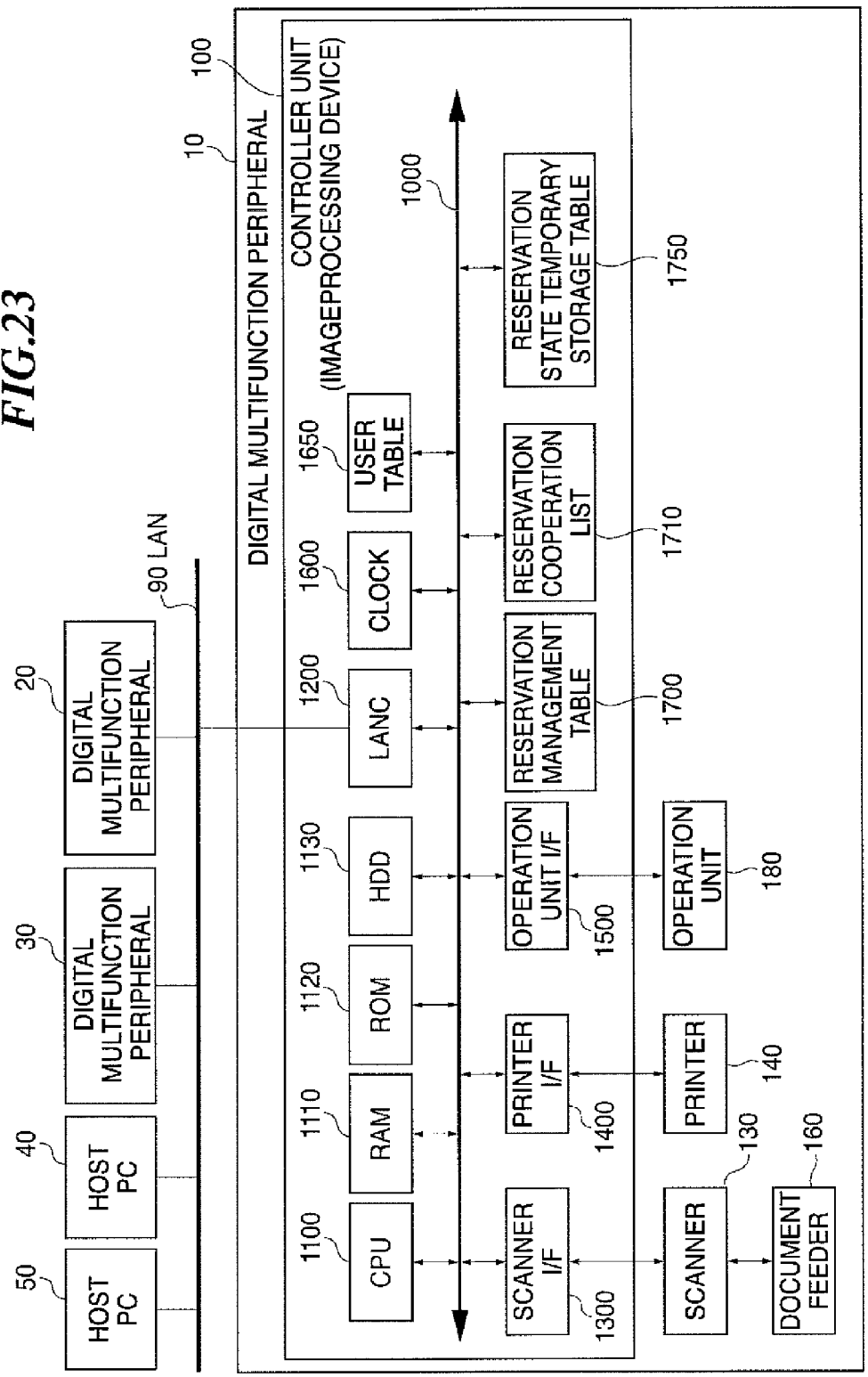
FIG. 23 is a block diagram schematically showing configuration of a controller unit of a digital multifunction peripheral as a processing apparatus according to a second embodiment of the present invention.

FIG. 23 is a block diagram schematically showing configuration of a controller unit of a digital multifunction peripheral as a processing apparatus according to the second embodiment of the present invention.

This embodiment differs from the first embodiment shown in FIG. 2 in that the reservation master flag 1720 and the reservation master machine name retaining unit 1730 are not provided, but a reservation state temporary storage table 1750 is provided in place of them.

In FIG. 23, the reservation state temporary storage table 1750 temporarily stores a result of collecting reservation information from peripherals cooperating at reservation execution. The table 1750 stores reservation states of the cooperative peripherals during a time period for which a reservation is executed, which is used to check the number of peripherals (digital multifunction peripherals) that have not been reserved or peripheral names.

FIG. 24 is a diagram showing an example of the reservation state temporary storage table in FIG. 23.

The reservation state temporary storage table, which is a table that stores information of a reservation state response command described later, includes a reservation date, a reservation starting time, a reservation termination time, a reservation availability status and a peripheral name, as shown in FIG. 24.

<User Operation in Exclusive Reservation Service>

The user operation in the exclusive reservation service is the same as that of the first embodiment. A user performs the same operation as in the first embodiment described in relation to FIGS. 4 to 10.

<Flow of Exclusive Reservation Processing>

Next, the flow of exclusive reservation processing according to the second embodiment will be described with reference to FIGS. 25 to 29.

Figures 26A, 26B:
FIG. 26A is a diagram showing a reservation status of the printing system before a certain exclusive reservation is made.
FIG. 26B is a diagram showing a reservation status of the printing system after the certain exclusive reservation is made.

FIG. 25 is a schematic diagram showing the processing of exclusive reservation processing applied on the printing system according to the second embodiment. FIG. 26A is a diagram showing a reservation status of the printing system before a certain exclusive reservation is made; and FIG. 26B is a diagram showing a reservation status of the printing system after the certain exclusive reservation is made. A user attempts an exclusive reservation of the MFP-B in the state shown in FIG. 26A.

FIG. 27A is a diagram showing a format of a reservation state confirmation command used in the exclusive reservation processing; FIG. 27B is a drawing showing a format of a reservation state response command used in the exclusive reservation processing; and FIG. 27C is a diagram showing a format of a reservation forbid command used in the exclusive reservation processing. FIG. 28A is a diagram showing the initial state of the reservation management table 1700; and FIG. 28B is a diagram showing the state of the reservation management table 1700 after acceptance of a reservation. FIG. 29 is a diagram showing a state of the reservation management table 1700 after the exclusive reservation is forbidden.

Suppose that the user 20a of the digital multifunction peripheral 20 makes an exclusive reservation implying that the user wishes to exclusively use the digital multifunction peripheral 20 from 9:00 to 10:00 if the user 10a has completed an exclusive reservation of the digital multifunction peripheral 10 from 9:00 to 10:00, for example. Then, the exclusive reservation of the digital multifunction peripheral 20 is completed, and the exclusive reservation of the digital multifunction peripheral 30 from 9:00 to 10:00 is forbidden to be accepted (see W21 in FIG. 26A showing a reservation status before an exclusive reservation is made and W22 in FIG. 26B showing a reservation status after the exclusive reservation is made). Accordingly, exclusive reservations of all peripherals (here, the MFP-A, MFP-B and MFP-C) are prevented during a certain time period. In the case shown in FIG. 26B, an exclusive reservation of the MFP-C is forbidden from 9:00 to 10:00. As a result, an exclusive reservation during that time period is not accepted.

The following will describe exclusive reservation processing in this embodiment to obtain the result as above using the following three phases in that order:

(A) Reservation State Collecting Phase
(B) Reservation State Check Phase
(C) Reservation Forbid Phase (A) Reservation State Collecting Phase The user 20a operates the operation unit 180 of the digital multifunction peripheral 20 and executes an exclusive reservation according to the procedures in FIGS. 4 to 7 described before. Then, the digital multifunction peripheral 20 transmits a reservation state confirmation command to all cooperative peripherals listed in a reservation cooperation List (T11 in FIG. 11). In this embodiment, the reservation state confirmation command is transmitted to the digital multifunction peripheral 10 and the digital multifunction peripheral 30.

The reservation state confirmation command includes parameters of a reservation date, a reservation starting time and a reservation termination time, as shown in FIG. 27A. In a state to check a reservation, the reservation management table 1700 stays in the initial state shown in FIG. 28A.

(B) Reservation State Check Phase

First, processing in a peripheral that received the reservation state confirmation command will be described.

The peripheral that received the reservation state confirmation command checks whether or not a time period indicated in the reservation state confirmation command is reserved with reference to the reservation management table 1700 in the peripheral itself, and answers to the sender of the reservation state confirmation command in a reservation state response command (T12 and T22 in FIG. 11).

A reservation state response command includes parameters of a reservation date, a reservation starting time, a reservation termination time and a reservation availability status, as shown in FIG. 27B. A reservation availability status reflects "OK" or "NG" as a result of checking the reservation management table 1700. If reserved, a reservation availability status changes to "NG". Otherwise, if not reserved, a reservation availability status changes to "OK".

Next, processing in a peripheral that received the reservation state response command will be described.

The peripheral that received the reservation state response command stores a reservation status indicated in the reservation state response command in the reservation state temporary storage table 1750. It is checked whether or not the number of peripherals that have not been exclusively reserved other than the peripheral itself is one or more from information in the reservation state temporary storage table 1750 and the reservation cooperation list. If the number of peripherals that have not been exclusively reserved other than the peripheral itself is one or more, it is determined that a reservation is completed. If there is no peripheral that has not been exclusively reserved other than the peripheral itself, it is determined that reservation is unavailable. As shown in FIGS. 8 and 9 described before, a check screen for an execution result of an exclusive reservation is in either state of reservation completed or reservation unavailable.

In FIG. 24, the digital multifunction peripheral 30 in addition to the digital multifunction peripheral 20 is not exclusively reserved, so that the digital multifunction peripheral 20 changes to a reservation completed state. Meanwhile, the reservation management table 1700 changes to a state in FIG. 28B. As shown in FIG. 28B, the digital multifunction peripheral 20 adds a reservation record indicating "reservation date: 2006/06/06, reservation starting time: 9:00, reservation termination time: 10:00, peripheral name: MFP-B, user name: tanaka".

(C) Reservation Forbid Phase

First, processing in a peripheral that received the reservation state response command will be described.

The peripheral that received the reservation state response command checks whether or not the number of the peripherals that have not exclusively reserved yet is one from a reservation status indicated in the reservation state response command. As a result of the check, if the number of the peripherals is one, then a reservation forbid command is transmitted to the single peripheral to forbid acceptance of an exclusive reservation.

In this embodiment, a peripheral not being exclusively reserved during a time period from 9:00 to 10:00 other than the digital multifunction peripheral 20 is the digital multifunction peripheral 30 (MFP-C) only. Accordingly, the digital multifunction peripheral 20 transmits a reservation forbid command to the digital multifunction peripheral 30.

A reservation forbid command includes parameters of a forbidden date, a forbid starting time and a forbid termination time, as shown in FIG. 27C. The reservation management table 1700 changes to a state as shown in FIG. 29. The digital multifunction peripheral 30 adds the reservation forbid state to the reservation management table 1700. As shown in FIG. 29, the digital multifunction peripheral 30 adds a reservation forbid record indicating "reservation date: 2006/06/06, reservation starting time: 9:00, reservation termination time: 10:00, peripheral name: MFP-C, status: forbidden".

<Peripheral Internal Processing for Exclusive Reservation Processing>

The reservation forbid flow is the same as that in the first embodiment described in relation to FIG. 18.

(A) Reservation Execution Flow

FIG. 30 is a flowchart showing the reservation execution processing according to the second embodiment.

This processing is executed in a digital multifunction peripheral for which a user operates execution of the exclusive reservation service.

In the processing, execution of an exclusive reservation is received through a user operation, a reservation state confirmation command is transmitted to all cooperative peripherals, a reservation state response command is received, and reservation states of the cooperative peripherals during a time period for an exclusive reservation are stored. Next, the number of peripherals that have not been exclusively reserved yet or peripheral names of the peripherals are checked, it is determined whether a reservation is completed or unavailable, the reservation management table 1700 is updated, and notification is made to the user. Finally, the number of peripherals that have not been exclusively reserved is again checked, and it is determined whether or not a reservation needs to be forbidden. If necessary, reservation forbid is directed. The processing will be described below in detail with reference to FIG. 30.

In FIG. 30, first, in step S4000, execution of an exclusive reservation from a user is accepted, and the processing proceeds to step S4001. The step corresponds to a state that the reservation execution button 2210 in FIG. 7 is pressed. In the next step S4001, a reservation state confirmation command is transmitted to all cooperative peripherals listed in a reservation cooperation list, and the processing proceeds to step S4002. A reservation state confirmation command includes parameters of a reservation date, a reservation starting time and a reservation termination time, as shown in FIG. 27A.

In step S4002, the reservation state response command is received, a reservation status indicated in the reservation state response command is stored in the reservation state temporary storage table 1750, and the processing proceeds to step S4003. In step S4003, it is checked whether or not the number of peripherals that have not been exclusively reserved other than the peripheral itself is one or more from information in the reservation state temporary storage table 1750 and the reservation cooperation list. If the number of peripherals that have not been exclusively reserved other than the peripheral itself is one or more, the processing proceeds to step S4004. If there is no peripheral that has not been exclusively reserved other than the peripheral itself, the processing proceeds to step S4008.

In step S4004, a reservation record is added as reservation information to the reservation management table 1700, and the processing proceeds to step S4005. In step S4005, the number of peripherals that have not been exclusively reserved yet is again checked based on the information in the reservation state temporary storage table 1750 and the reservation cooperation list. If the number of peripherals that have not been exclusively reserved is one, the processing proceeds to step S4006. Otherwise, the processing proceeds to step S4007.

In step S4006, a reservation forbid command is transmitted to the only peripheral that has not been exclusively reserved stored in the reservation state temporary storage table 1750, and the processing proceeds to step S4007. In step S4007, a user is notified of reservation completed, and this processing finishes. At that time, the reservation completed screen in FIG. 8 is displayed.

Meanwhile, a user is notified of reservation rejected in step S4008, and this processing finishes. At that time, the screen of reservation rejected shown in FIG. 9 is displayed.

This embodiment can also have advantages similar to those of the first embodiment described in the above.

It is to be understood that the object of the present invention may also be accomplished by supplying a system or an apparatus with a storage medium in which a program code of software which realizes the functions of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of each of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of each of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-260833, filed Sep. 26, 2006, which is hereby incorporated by reference herein in its entirety.

What is claimed is:

1. A processing apparatus that can communicate with a plurality of apparatuses, comprising:
   a storing unit adapted to store reservation information about a reservation for use of a particular apparatus among the plurality of apparatuses during a period;
   a detecting unit adapted to detect the number of at least one apparatus among the plurality of apparatuses that has not been reserved yet during a particular period with reference to the reservation information; and
   a control unit adapted to control not to accept a new reservation for use of the at least one apparatus, that has not been reserved yet during the particular period, during the particular period if the number detected by said detecting unit is less than a predetermined number.

2. A processing apparatus according to claim 1, wherein said control unit is adapted to issue an instruction not to accept the new reservation for the use during the particular period to the at least one apparatus that has not been reserved yet during the particular period so as to control not to accept the new reservation for the use of the at least one apparatus during the particular period, if the number detected by said detecting unit is less than the predetermined number.

3. A processing apparatus according to claim 1, further comprising:
   an accepting unit adapted to accept a reservation request for a reservation for use of any one of the plurality of apparatuses during the particular period;
   a determining unit adapted to determine whether or not the reservation from the accepted reservation request is available with reference to the reservation information stored in said storing unit; and
   an update unit adapted to add information indicating a reservation for use of one of the plurality of apparatuses during the particular period to the reservation information stored in said storing unit if said determining unit determines that the reservation is available.

4. A processing apparatus that can communicate with another processing apparatus, comprising:
   a storing unit adapted to store reservation information about a reservation for use of a particular apparatus, among the processing apparatus and the other processing apparatus, during a period;
   a detecting unit adapted to detect, among the processing apparatus and the other processing apparatus, the number of at least one apparatus that has not been reserved yet during a particular period with reference to the reservation information; and
   a control unit adapted to control not to accept a new reservation for use of the at least one apparatus, that has not been reserved yet during the particular period, during the particular period if the number detected by said detecting unit is less than a predetermined number.

5. A reservation processing method applied to a processing apparatus that can communicate with a plurality of apparatuses, comprising:
   a storing step of storing reservation information about a reservation for use of a particular apparatus among the plurality of apparatuses during a period;
   a detecting step of detecting the number of at least one apparatus among the plurality of apparatuses that has not been reserved yet during a particular period with reference to the reservation information; and
   a control step of controlling not to accept a new reservation for use of the at least one apparatus, that has not been reserved yet during the particular period, during the particular period if the number detected in said detecting step is less than a predetermined number.

6. A reservation processing method applied to a processing apparatus that can communicate with another processing apparatus, comprising:
   a storing step of storing reservation information about a reservation for use of a particular apparatus, among the processing apparatus and the other processing apparatus, during a period;

a detecting step of detecting, among the processing apparatus and the other processing apparatus, the number of at least one apparatus that has not been reserved yet during a particular period with reference to the reservation information; and a control step of controlling not to accept a new reservation for use of the at least one apparatus, that has not been reserved yet during the particular period, during the particular period if the number detected in said detecting step is less than a predetermined number.

7. A non-transitory storage medium for storing a program that, when executed by a computer, causes the computer to execute a reservation processing method applied to a processing apparatus that can communicate with a plurality of apparatuses, the program comprising:

a storing module for storing reservation information about a reservation for use of a particular apparatus among the plurality of apparatuses during a period;

a detecting module for detecting the number of at least one apparatus among the plurality of apparatuses that has not been reserved yet during a particular period with reference to the reservation information; and a control module for controlling not to accept a new reservation for use during the particular period if the number detected by said detecting module is less than a predetermined number.

8. A non-transitory storage medium for storing a program that, when executed by a computer, causes the computer to execute a reservation processing method applied to a processing apparatus that can communicate with another processing apparatus, the program comprising:

a storing module for storing reservation information about a reservation for use of a particular apparatus, among the processing apparatus and the other processing apparatus, during a period;

a detecting module for detecting, among the processing apparatus and the other processing apparatus, the number of at least one apparatus that has not been reserved yet during a particular period with reference to the reservation information; and a control module for controlling not to accept a new reservation for use of the at least one apparatus, that has not been reserved yet during the particular period, during the particular period if the number detected by said detecting module is less than a predetermined number.

9. A processing apparatus according to claim 4, wherein said control unit is adapted to issue an instruction not to accept the new reservation for the use during the particular period to the at least one apparatus that has not been reserved yet during the particular period if the number detected by said detecting unit is less than a predetermined number.

* * * * *